(12) United States Patent
Yokono

(10) Patent No.: US 9,275,305 B2
(45) Date of Patent: Mar. 1, 2016

(54) LEARNING DEVICE AND METHOD, RECOGNITION DEVICE AND METHOD, AND PROGRAM

(75) Inventor: Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 1134 days.

(21) Appl. No.: 12/915,838

(22) Filed: Oct. 29, 2010

(65) Prior Publication Data

US 2011/0135192 A1 Jun. 9, 2011
US 2015/0161481 A9 Jun. 11, 2015

Related U.S. Application Data

(63) Continuation-in-part of application No. 12/571,946, filed on Oct. 1, 2009, now Pat. No. 8,494,258.

(30) Foreign Application Priority Data

Oct. 3, 2008 (JP) ................. 2008-258011
Mar. 9, 2009 (JP) ................. 2009-055062
Dec. 3, 2009 (JP) ................. 2009-275815

(51) Int. Cl.
*G06K 9/00* (2006.01)
*G06K 9/62* (2006.01)
*G06K 9/46* (2006.01)

(52) U.S. Cl.
CPC .......... *G06K 9/6256* (2013.01); *G06K 9/00369* (2013.01); *G06K 9/46* (2013.01); *G06K 9/468* (2013.01); *G06K 9/4614* (2013.01); *G06K 9/4619* (2013.01); *G06K 9/4642* (2013.01); *G06K 9/4647* (2013.01); *G06K 2009/4666* (2013.01)

(58) Field of Classification Search
USPC .................................. 382/159, 103
See application file for complete search history.

(56) References Cited

U.S. PATENT DOCUMENTS 8,396,285 B2 * 3/2013 Maurer et al. ................. 382/154

OTHER PUBLICATIONS

Viola et al, Rapid Object Detection using a Boosted Cascade of Simple Features, 2001, IEEE, I-511-I518.*
Bo Wu et al., "Detection of Multiple, Partially Occluded Humans in a Single Image by Bayesian combination of Edgelet Part Detectors", in Proc. $10^{th}$ Int. conf. Computer Vision, 2005.
Navneet Dalal et al., "Histograms of Oriented Gradients for Human Detection", CVPR, 2005.

* cited by examiner

*Primary Examiner* — Kathleen Y Dulaney
(74) *Attorney, Agent, or Firm* — Sony Corporation

(57) ABSTRACT

A learning device includes: a generating unit configured to generate an image having different resolution from an input image; an extracting unit configured to extract a feature point serving as a processing object from an image generated by the generating unit; a calculating unit configured to calculate the feature amount of the feature point by subjecting the feature point to filter processing employing a predetermined filter; and an identifier generating unit configured to generate an identifier for detecting a predetermined target object from the image by statistical learning employing the feature amount; with the filter including a plurality of regions, and the calculating unit taking the difference value of difference within the regions as the feature amount.

5 Claims, 19 Drawing Sheets

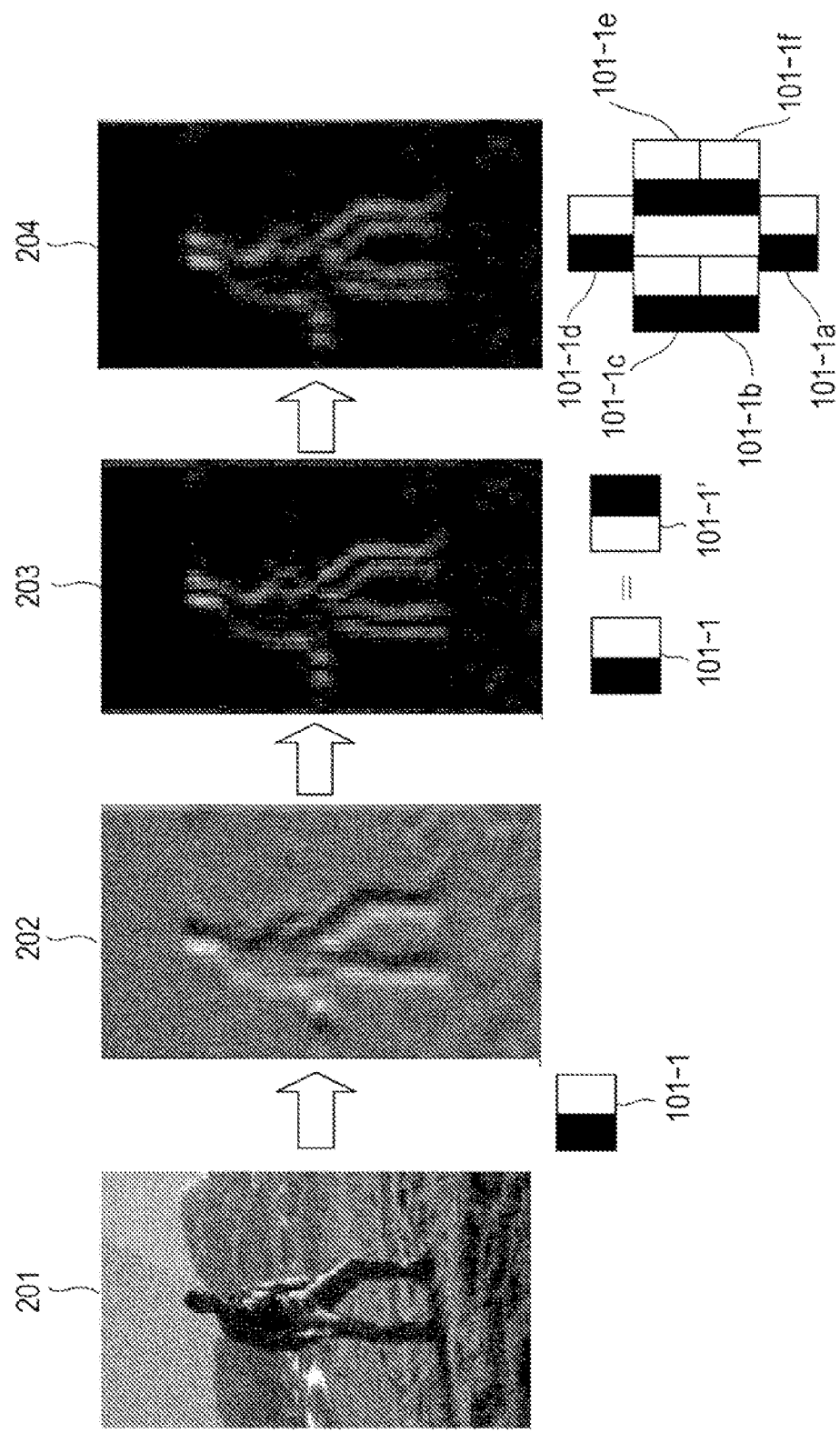

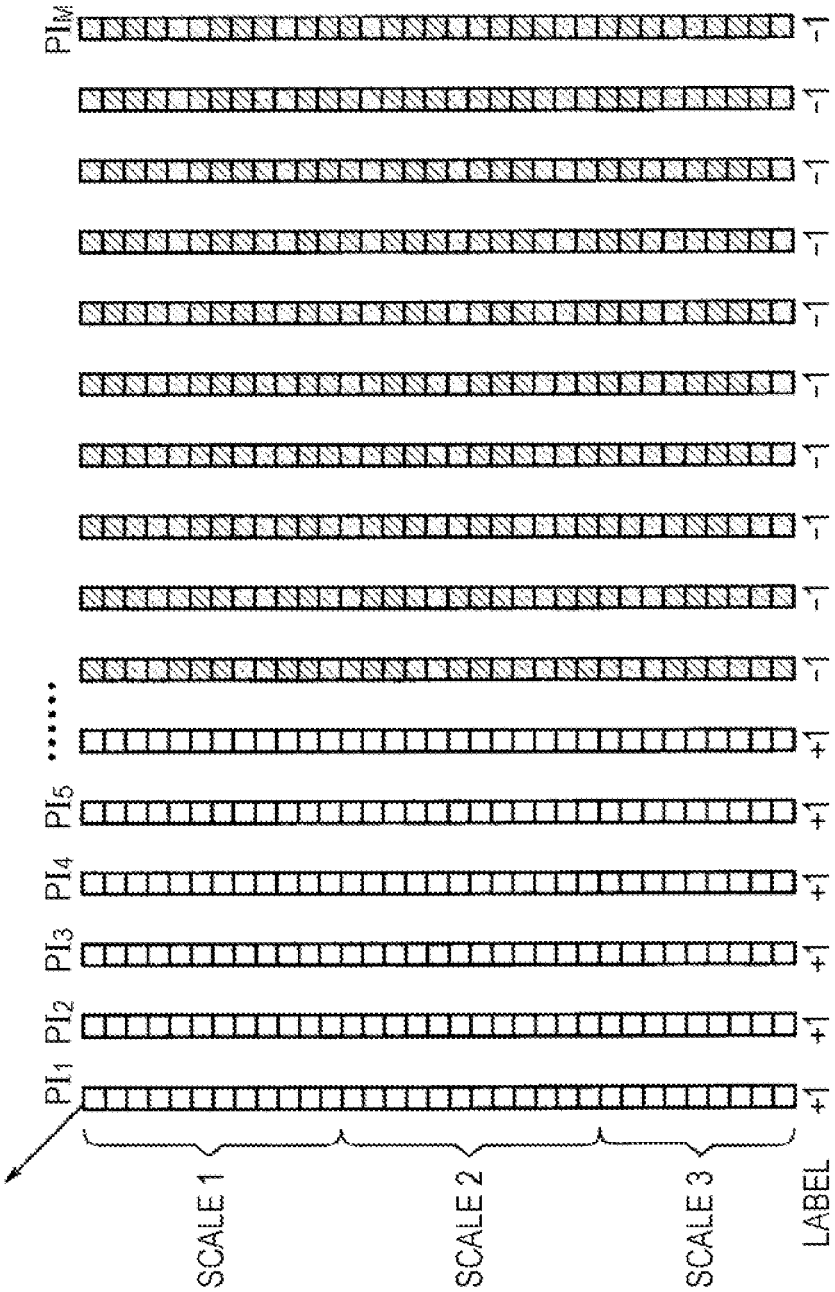

LEARNING DEVICE AND METHOD, RECOGNITION DEVICE AND METHOD, AND PROGRAM

CROSS REFERENCE TO RELATED APPLICATIONS

The present application is a continuation-in-part of U.S. patent application Ser. No. 12/571,946 filed on Oct. 1, 2009, now U.S. Pat. No. 8,494,258, which makes reference to, claims priority to and claims benefit from Japanese Priority Patent Application JP 2008-258011 filed in the Japan Patent Office on Oct. 3, 2008 and Japanese Priority Patent Application JP 2009-055062 filed in the Japan Patent Office on Mar. 9, 2009. The present application contains subject matter related to that disclosed in Japanese Priority Patent Application JP 2009-275815 filed in the Japan Patent Office on Dec. 3, 2009, the entire content of which is hereby incorporated by reference.

BACKGROUND OF THE INVENTION

1. Field of the Invention

The present invention relates to a learning device and method, a recognition device and method, and a program, and specifically, a learning device and method, a recognition device and method, and a program, which enable a target object to be detected from an image in a surer manner.

2. Description of the Related Art

Heretofore, technology for detecting a person from an image has been studied and developed principally for security or in-vehicle use (e.g., see Navneet Dalal and Bill Triggs "Histograms of Oriented Gradients for Human Detection" CVPR2005, and B. Wu and R. Nevatia "Detection of multiple, partially occluded humans in a single image by bayesian combination of edgelet part detectors" In Proc. $10^{th}$ Int. Conf. Computer Vision, 2005). With Navneet Dalal and Bill Triggs "Histograms of Oriented Gradients for Human Detection" CVPR2005, and B. Wu and R. Nevatia "Detection of multiple, partially occluded humans in a single image by bayesian combination of edgelet part detectors" In Proc. $10^{th}$ Int. Conf. Computer Vision, 2005, a feature amount to be obtained by edge extraction is employed as a principal feature amount for detecting (recognizing) a person from an image. With these techniques, various variations of a feature amount obtained by edge extraction are defined as a new feature amount, and recognition of a person is performed.

For example, with Navneet Dalal and Bill Triggs "Histograms of Oriented Gradients for Human Detection" CVPR2005, there is provided an advantage wherein a feature amount is obtained by obtaining a histogram in a direction within a small region including an edge, and employing this feature amount makes this technique strong against some distortion of outlines, and so forth.

SUMMARY OF THE INVENTION

With the above methods for detecting a person or the like from an image, an object is detected by employing the features of outlines, but it has been requested to perform detection with high precision.

It has been found to be desirable to enable a target object such as a person or the like to be detected in an accurate manner.

A learning device according to an embodiment of the present invention includes: a generating unit configured to generate an image having different resolution from an input image; an extracting unit configured to extract a feature point serving as a processing object from an image generated by the generating unit; a calculating unit configured to calculate the feature amount of the feature point by subjecting the feature point to filter processing employing a predetermined filter; and an identifier generating unit configured to generate an identifier for detecting a predetermined target object from the image by statistical learning employing the feature amount; with the filter including a plurality of regions, and the calculating unit taking the difference value of difference within the regions as the feature amount.

The regions of the predetermined filter may have a rectangular shape.

The calculating unit may execute convolution operation in a differential function of a predetermined order of a Gaussian function in an arbitrary angle to calculate the summation of the absolute values of the operation results.

The calculating unit may execute convolution operation in a differential function of a predetermined order of a Gaussian function in an arbitrary angle to calculate the maximum value of the absolute values of the operation results.

The calculating unit may calculate the summation or average value of the pixel values of pixels positioned within the region for each of the plurality of regions, calculate the difference of the summation or average value thereof, and take the absolute value of the difference value thereof as the feature amount.

The calculating unit may create a histogram from the pixel values of pixels positioned within the region for each of the plurality of regions, calculate the difference of the values thereof, and take the absolute value of the difference value thereof as the feature amount.

The calculating unit may create a histogram from the pixel values of pixels positioned within the region for each of the plurality of regions, perform normalization so that the sum of the histogram thereof becomes 1, calculate the difference of the values of the normalized histogram, and take the absolute value of the difference value thereof as the feature amount.

The calculating unit may apply a filter applied to a feature point serving as a reference point to a plurality of feature points positioned in the neighborhood of the feature point serving as the reference thereof, and take the summation or average value of the feature amounts calculated from these plurality of feature points as the feature amount of the feature point serving as the reference.

A learning method according to an embodiment of the present invention includes the steps of: generating an image having different resolution from an input image; extracting a feature point from the generated image; calculating the feature amount of the feature point by subjecting the feature point to filter processing employing a predetermined filter; and generating an identifier for detecting a predetermined target object from the image by statistical learning employing the feature amount; with the filter including a plurality of regions, and the difference value of the difference within the regions thereof being taken as the feature amount.

A first program according to an embodiment of the present invention is a computer-readable program causing a computer to execute processing including the steps of: generating an image having different resolution from an input image; extracting a feature point from the generated image; calculating the feature amount of the feature point by subjecting the feature point to filter processing employing a predetermined filter; and generating an identifier for detecting a predetermined target object from the image by statistical learning employing the feature amount; with the filter including a plurality of regions, and the difference value of the difference within the regions thereof being taken as the feature amount.

With the learning device and method, and the first program according to the embodiment of the present invention, an image having different resolution is generated from an input image, a feature point serving as a processing object is extracted from the generated image thereof, the feature amount of the feature point is calculated by subjecting the feature point to filter processing employing a predetermined filter, and an identifier for detecting a predetermined target object is generated from the image by statistical learning employing the feature amount. Also, the filter thereof includes a plurality of regions, and is a filter whereby the difference value of the difference within the regions thereof is taken as the feature amount.

A recognition device according to an embodiment of the present invention includes: a generating unit configured to generate an image having different resolution from an input image; an extracting unit configured to extract a feature point from an image generated by the generating unit; a calculating unit configured to calculate the feature amount of the feature point by subjecting the feature point to filter processing employing a predetermined filter; and a detecting unit configured to substitute the feature amount for an identifier for detecting a predetermined target object from an image, obtained by statistical learning, to detect the target object from the input image; with the filter including a plurality of regions, and the calculating unit taking the difference value of difference within the regions as the feature amount.

The regions of the predetermined filter may have a rectangular shape.

The calculating unit may execute convolution operation in a differential function of a predetermined order of a Gaussian function in an arbitrary angle to calculate the summation of the absolute values of the operation results.

The calculating unit may execute convolution operation in a differential function of a predetermined order of a Gaussian function in an arbitrary angle to calculate the maximum value of the absolute values of the operation results.

The calculating unit may calculate the summation or average value of the pixel values of pixels positioned within the region for each of the plurality of regions, calculate the difference of the summation or average value thereof, and take the absolute value of the difference value thereof as the feature amount.

The calculating unit may create a histogram from the pixel values of pixels positioned within the region for each of the plurality of regions, calculate the difference of the values thereof, and take the absolute value of the difference value thereof as the feature amount.

The calculating unit may create a histogram from the pixel values of pixels positioned within the region for each of the plurality of regions, perform normalization so that the sum of the histogram thereof becomes 1, calculate the difference of the values of the normalized histogram, and take the absolute value of the difference value thereof as the feature amount.

The calculating unit may apply a filter applied to a feature point serving as a reference point to a plurality of feature points positioned in the neighborhood of the feature point serving as the reference thereof, and take the summation or average value of the feature amounts calculated from these plurality of feature points as the feature amount of the feature point serving as the reference.

A recognition method according to an embodiment of the present invention includes the steps of: generating an image having a different scale coefficient from an input image; extracting a feature point from the generated image; calculating the feature amount of the feature point by subjecting the feature point to filter processing employing a predetermined filter; and substituting the feature amount for an identifier for detecting a predetermined target object from an image, obtained by statistical learning, to detect the target object from the input image; with the filter includes a plurality of regions, and the difference value of difference within the regions being taken as the feature amount.

A second program according to an embodiment of the present invention is a computer-readable program causing a computer to execute processing including the steps of: generating an image having a different scale coefficient from an input image; extracting a feature point from the generated image; calculating the feature amount of the feature point by subjecting the feature point to filter processing employing a predetermined filter; and substituting the feature amount for an identifier for detecting a predetermined target object from an image, obtained by statistical learning, to detect the target object from the input image; with the filter including a plurality of regions, and the difference value of difference within the regions being taken as the feature amount.

With the recognition device and method, and the second program according to the embodiment of the present invention, an image having a different scale coefficient is generated from an input image, a feature point is extracted from the generated image, the feature amount of the feature point is calculated by subjecting the extracted feature point to filter processing employing a predetermined filter, the feature amount is substituted for an identifier for detecting a predetermined target object from an image, obtained by statistical learning, and the target object is detected from the input image. The filter to be applied includes a plurality of regions, and is a filter whereby the difference value of difference within the regions is taken as the feature amount.

According to the above configurations, a target object can be detected with high precision.

BRIEF DESCRIPTION OF THE DRAWINGS

FIG. 10 is a diagram for describing extraction of feature points;

FIG. 11 is a diagram for describing a feature amount;

DESCRIPTION OF THE PREFERRED EMBODIMENTS

Figure 1:
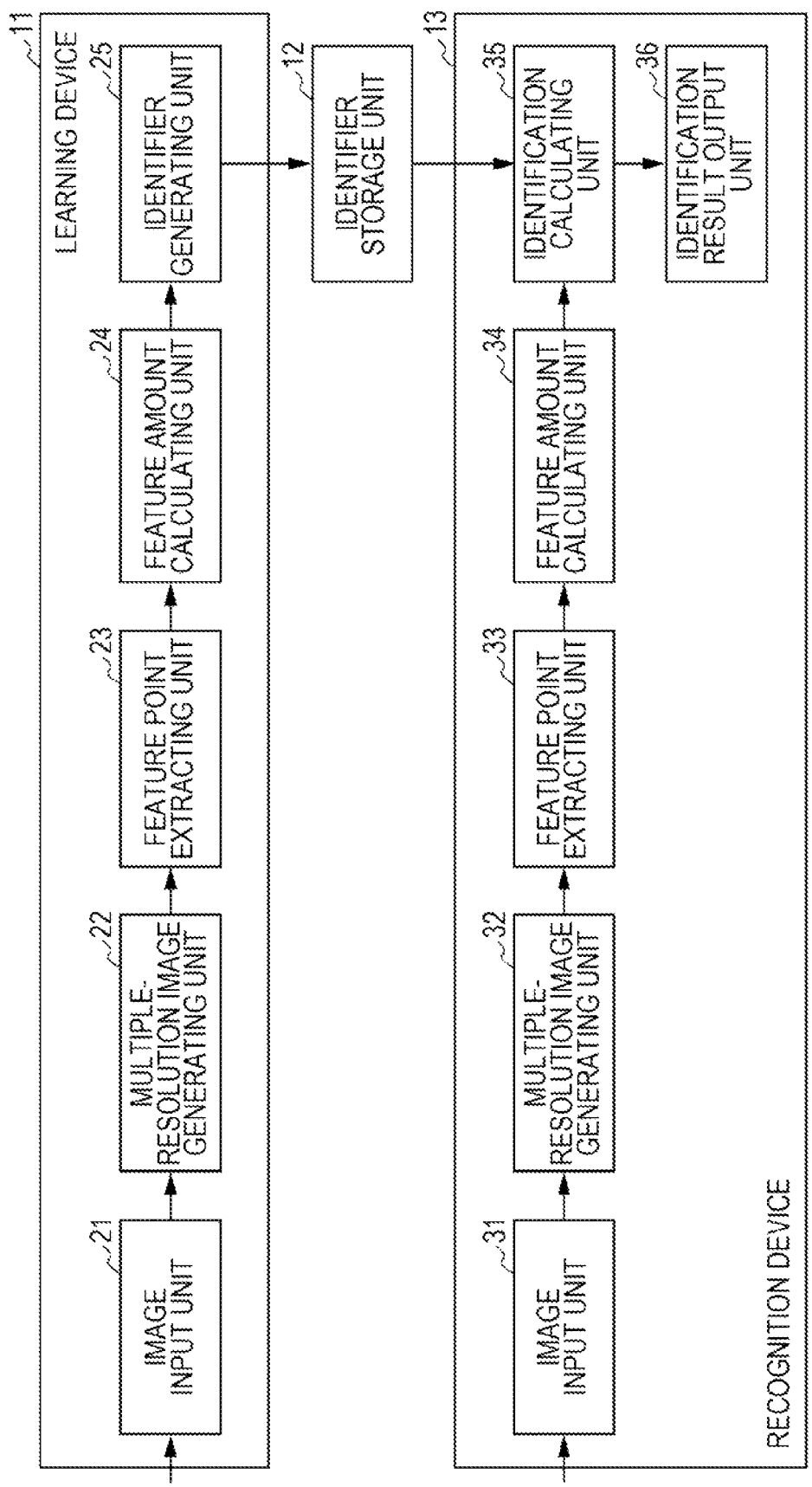
FIG. 1 is a diagram illustrating the configuration of an embodiment of an identifying system to which the present invention has been applied.

Hereafter, embodiments of the present invention will be described with reference to the drawings.
System Configuration FIG. 1 is a block diagram illustrating a configuration example of an embodiment of an object identifying system to which the present invention has been applied. This object identifying system is made up of a learning device 11, an identifier recording unit 12, and a recognition device 13, and is for allowing a region including the image of a person serving as a target object for example in an input image to be recognized.

The learning device 11 generates, based on an input learning image, an identifier to be used at the time of performing processing for identifying whether or not there is a target object on an image in the recognition device 13, and records this in the identifier recording unit 12. The recognition device 13 uses a feature amount for identification and an identifier recorded in the identifier recording unit 12 to identify whether or not there is the image of a target object in the input image which has been input, and outputs the identification result thereof.

The learning device 11 is configured of an image input unit 21, a multiple-resolution image generating unit 22, a feature point extracting unit 23, a feature amount calculating unit 24, and an identifier generating unit 25.

The multiple-resolution image generating unit 22 generates multiple images which mutually have different resolution from a learning image input by the image input unit 21, and supplies these images to the feature point extracting unit 23 as multiple resolution images. For example, multiple resolution images of eight resolution hierarchies of level L1 through level L8 are generated. Here, let us say that the multiple resolution image of the level L1 has the highest resolution, and the resolutions of the multiple resolution images become lower in order from the level L1 to the level L8.

The feature point extracting unit 23 extracts, from each image (learning image) making up the multiple resolution images generated at the multiple-resolution image generating unit 22, several pixels of the image thereof as feature points to be used at the time of generating an identifier, and supplies the extracted feature points and the learning image to the feature amount calculating unit 24. Here, the identifier mentioned here is a strong identifier made up of multiple weak identifiers, generated by statistical learning, and is used at the time of identifying whether or not there is a region including the image of an object within the input image by taking advantage of the outline of the object for example.

The feature amount calculating unit 24 calculates a feature amount indicating the extracted outline for each feature point by filter processing employing a steerable filter for example based on the learning image from the feature point extracting unit 23, and supplies the obtained feature amount and learned image to the identifier generating unit 25. The identifier generating unit 25 performs statistical learning processing by Adaboost for example, based on the learning image and feature amount supplied from the feature amount calculating unit 24 to generate an identifier for recognizing a person serving as a target object for example. Also, the identifier generating unit 26 supplies the generated identifier to the identifier storage unit 12.

The recognition device 13 is configured of an image input unit 31, a multiple-resolution image generating unit 32, a feature point extracting unit 33, a feature amount calculating unit 34, an identifier calculating unit 35, and an identification result output unit 36. Each of the image input unit 31 multiple-resolution image generating unit 32, feature point extracting unit 33, and feature amount calculating unit 34 of the recognition device 13 performs the same processing as each of the image input unit 21, multiple-resolution image generating unit 22, feature point extracting unit 23, and feature amount calculating unit 24 of the learning device 11 as to an input image from which a target object is recognized, and accordingly, the detailed description thereof will be omitted.

The identification calculating unit 35 reads out the feature amount for identification, and the identifier recorded in the identifier recording unit 12. Also, the identification calculating unit 35 substitutes the feature amount corresponding to the feature amount for identification of the featured amounts from the feature amount calculating unit 34 for the readout identifier to perform the operation. The identification result output unit 36 obtains the calculation results at the identification calculating unit 35 to output the identification result regarding whether or not the target object has been recognized from the input image based on the calculation results.

Figure 2:
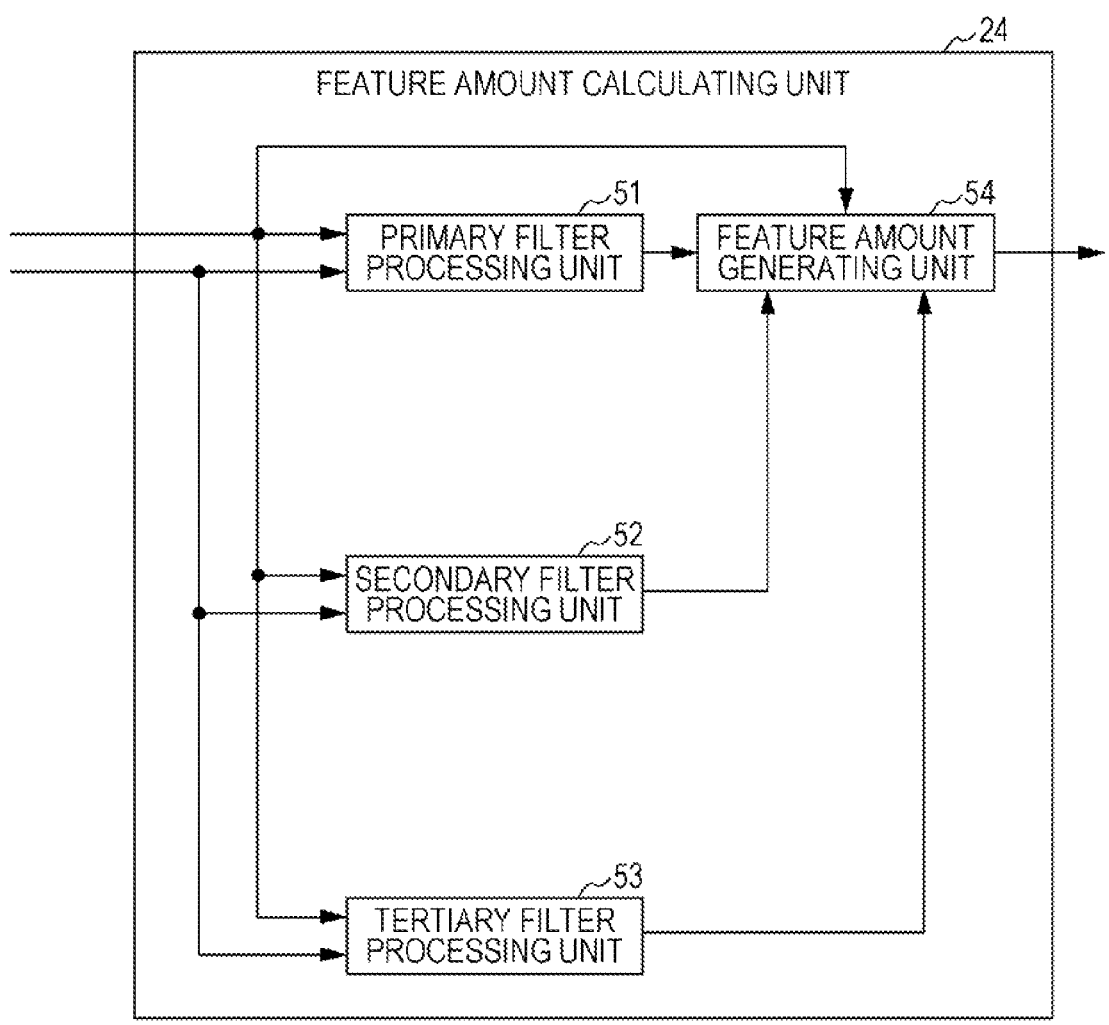
FIG. 2 is a diagram illustrating a detailed configuration example of a feature amount calculating unit.

The feature point extracting unit 23(33) and the feature amount calculating unit 24 (34) differ in the internal configuration and what kind of processing is executed depending on what kind of filter is used. First, description will be made regarding a case where a filter employing a differential function is applied.
Case of Using Differential Function as Filter FIG. 2 is a diagram illustrating a more detailed configuration example of the feature amount calculating unit 24 in FIG. 1. The feature amount calculating unit 34 has the same configuration as the feature amount calculating unit 24, and accordingly, the configuration of the feature amount calculating unit 24 will be described as an example. The feature amount calculating unit 24 is configured of a primary filter processing unit 51, a secondary filter processing unit 52, a tertiary filter processing unit 53, and a feature amount generating unit 54. Also, the learning image from the feature point extracting unit 23 is supplied to the primary filter processing unit 51 through the feature amount generating unit 54, and the feature point is supplied to the primary filter processing unit 51 through the tertiary filter processing unit 53.

The primary filter processing unit 51 subjects, for each supplied feature point, the feature point to filter processing by a primary differential function $G_1$ of a Gaussian function G to extract the feature amount, and supplies the feature amount to the feature amount generating unit 54. Here, the Gaussian function G and the primary differential function $G_1$ are indicated by the following Expression (1) and Expression (2).

$$G = e^{-\frac{x^2+y^2}{2\sigma^2}} \quad (1)$$

$$G_1(\theta) = \cos(\theta)G_1(0°) + \sin(\theta)G_1(90°) \quad (2)$$

In Expression (1), σ indicates Gaussian width. In Expression (2), θ indicates an arbitrary angle, and indicates the direction of a filter to be calculated.

For example, the primary filter processing unit 51 changes the Gaussian width σ of the Gaussian function G to three predetermined values (e.g., Gaussian width σ1, σ2, σ3=1, 2, 4), and calculates Expression (2) regarding predetermined four directions (e.g., θ=θ1, θ2, θ3, θ4) for each Gaussian width σ.

Note that the direction θ is not restricted to the four directions, and may be eight directions, e.g., each direction at the time of equally dividing pi into eight directions. Also, heretofore, as described above, the processing has been performed using multiple Gaussian widths, but with the present embodiment, one Gaussian width should be prepared, which will be described later. Accordingly, description has been made above wherein the Gaussian width is changed to three predetermined values, and Expression (2) is calculated regarding the predetermined four directions for each Gaussian width σ, but with the present embodiment, all that has to be done is to calculate Expression (2) regarding the predetermined four directions with the set Gaussian width σ.

Accordingly, calculation does not have to be performed for every multiple Gaussian widths, and accordingly, the calculation amount can be reduced. Such a situation is true for other filters, e.g., the secondary filter processing unit 52, and tertiary filter processing unit 53.

The secondary filter processing unit 52 subjects, for each supplied feature point, the feature point to filter processing by a secondary differential function $G_2$ of the Gaussian function G to extract the feature amount, and supplies this to the feature amount generating unit 54. The following Expression (3) indicates the secondary differential function $G_2$, and in Expression (3) θ indicates an arbitrary angle.

$$G_2(\theta) = k_{21}(\theta)G_2(0°) + k_{22}(\theta)G_2(60°) + k_{23}(\theta)G_2(120°) \quad (3)$$

Also, the coefficient $k_{2i}(\theta)$ (where i=1, 2, 3) in Expression (3) is a function indicated in the following Expression (4).

$$k_{2i}(\theta) = \frac{1}{3}\{1 + 2\cos(2(\theta - \theta_i))\} \quad (4)$$

For example, the secondary filter processing unit 52 calculates Expression (3) regarding predetermined four directions (e.g., θ=θ1, θ2, θ3, θ4) in the predetermined Gaussian width σ of the Gaussian function G.

The tertiary filter processing unit 53 subjects, for each supplied feature point, the feature point to filter processing by a tertiary differential function $G_3$ of the Gaussian function G to extract the feature amount, and supplies this to the feature amount generating unit 54. The following Expression (5) indicates the tertiary differential function $G_3$, and in Expression (5) θ indicates an arbitrary angle.

$$G_3(\theta) = k_{31}(\theta)G_3(0°) + k_{32}(\theta)G_3(45°) + k_{33}(\theta)G_3(90°) + k_{34}(\theta)G_3(135°) \quad (5)$$

Also, the coefficient $k_{3i}(\theta)$ (where i=1, 2, 3) in Expression (5) is a function indicated in the following Expression (6).

$$k_{31}(\theta) = \frac{1}{4}\{2\cos(\theta - \theta_i) + 2\cos(3(\theta - \theta_i))\} \quad (6)$$

For example, the tertiary filter processing unit 53 calculates Expression (5) regarding predetermined four directions (e.g., θ=θ1, θ2, θ3, θ4) in the predetermined Gaussian width σ of the Gaussian function G.

The feature amount generating unit 54 receives supply of the feature amount of each feature point calculated regarding four directions θ, supplied from each of the primary filter processing unit 51, secondary filter processing unit 52, and tertiary filter processing unit 53, arrays 12 (=3 (orders)×4 (directions)) supplied feature amounts in total, and takes these as the feature amounts in the feature point.

Also, multiple images having different resolution are supplied to each filter processing unit from the multiple-resolution image generating unit 22, and accordingly, the feature amounts of each feature point calculated regarding the four directions from each image are also supplied. These supplied feature amounts depend on the number of images that the multiple-resolution image generating unit 22 generates, and for example, in the event that eight images from level 1 to level 8 are generated, the feature amounts of each feature point calculated regarding eight images worth of four directions θ are supplied.

Also, the feature amount generating unit 54 supplies the generated feature amounts and the supplied learning image to the identifier generating unit 25.

Thus, with the feature amount calculating unit 24, a filter (basis function) having selectivity in the directions θ to be obtained by differentiating the Gaussian function is employed, a feature amount (outline) that differs for each differential order is extracted, and is taken as the feature mount.

Figure 3:
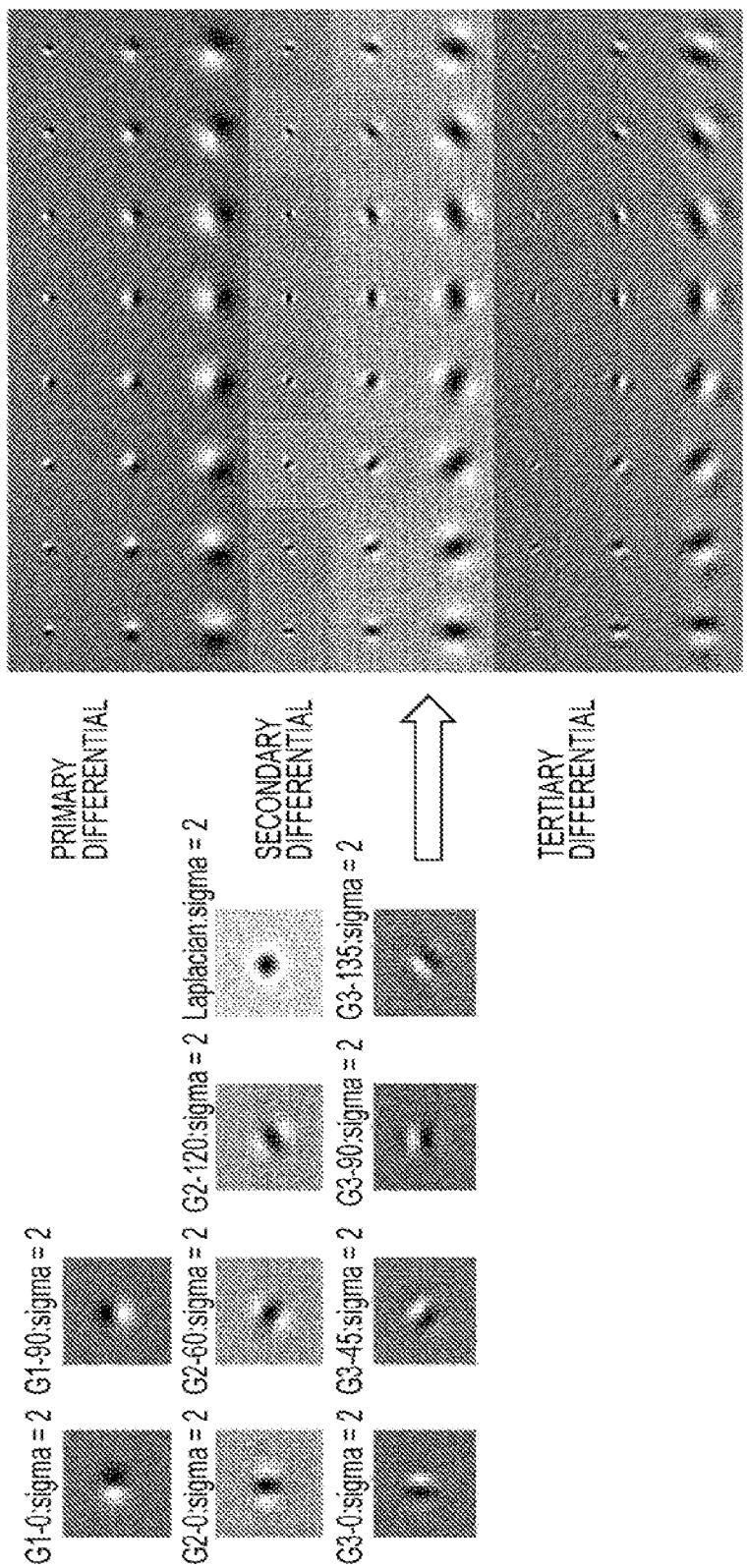
FIG. 3 is a diagram for describing a steerable filter.

In the event that a steerable filter is employed for extraction of feature amounts, as illustrated in FIG. 3, if filters of which the directions θ and the Gaussian widths σ differ are prepared, according to a linear combination of these filters, the filter of arbitrary direction θ, i.e., the differential function $G_n$ (where n=1, 2, 3) of the Gaussian function G can be expressed.

In FIG. 3, the images of the top row on the left side represent the primary differential function $G_1$ (0°) and the primary differential function $G_1$ (90°) in the event that the Gaussian width σ=2, in order from the left in the drawing. Also, in the drawing, the images of the middle row on the left side represent the secondary differential function $G_2$ (0°), secondary differential function $G_2$ (60°), secondary differential function $G_2$ (120°), and Laplacian in the event that the Gaussian width σ=2, in order from the left in the drawing. Further, in the drawing, the images of the bottom row on the left side represent the tertiary differential function $G_3$ (0°), tertiary differential function $G_3$ (45°), tertiary differential function $G_3$ (90°), and tertiary differential function $G_3$ (135°) in the event that the Gaussian width σ=2, in order from the left in the drawing.

Also, in the drawing, the images of the top row of the rows in the horizontal direction on the right side represent the primary differential function $G_1$ (θ) of which the θ is changed to 0, 1/8pi, 2/8pi, 3/8pi, 4/8pi, 5/8pi, 6/8pi, and 7/8pi in the event that the Gaussian width σ=1, in order from the left in the drawing.

Similarly, in the drawing, the images of each row in the horizontal direction on the right side indicate, in order from the second from the top to the lower direction in the drawing, the primary differential function $G_1$ (θ) in the event that the Gaussian width σ=2, the primary differential function $G_1(\theta)$ in the event that the Gaussian width σ=4, the secondary differential function $G_2(\theta)$ in the event that the Gaussian width σ=1, the secondary differential function $G_2(\theta)$ in the event that the Gaussian width σ=4, the tertiary differential function $G_3(\theta)$ in the event that the Gaussian width σ=1, the tertiary differential function $G_3(\theta)$ in the event that the Gaussian width σ=2, and the tertiary differential function $G_3(\theta)$ in the event that the Gaussian width σ=4. Subsequently, the images of each row thereof represent the differential function of which the θ is changed to 0, 1/8pi, 2/8pi, 3/8pi, 4/8pi, 5/8pi, 6/8pi, and 7/8pi in order from the left in the drawing.

For example, in the drawing, the primary differential function $G_1(0°)$ and the primary differential function $G_1(90°)$ that are filters on the left side are employed, whereby the primary differential function $G_1(\theta)$ in each direction θ of the second row from the top on the right side in the drawing can be represented. Similarly, the secondary differential function $G_2(\theta)$ in each direction θ indicated in the fifth row from the top on the right side in the drawing can be represented using the secondary differential function $G_2$ on the left side in the drawing, and the tertiary differential function $G_3(\theta)$ in each direction θ indicated in the eighth row from the top on the right side in the drawing can be represented using the tertiary differential function $G_3$ on the left side in the drawing. That is to say, the differential function in an arbitrary direction of each dimension can be, if there are basis functions of which the number is greater than the dimension thereof by one, represented by a linear combination of these basis functions.

Figure 4:
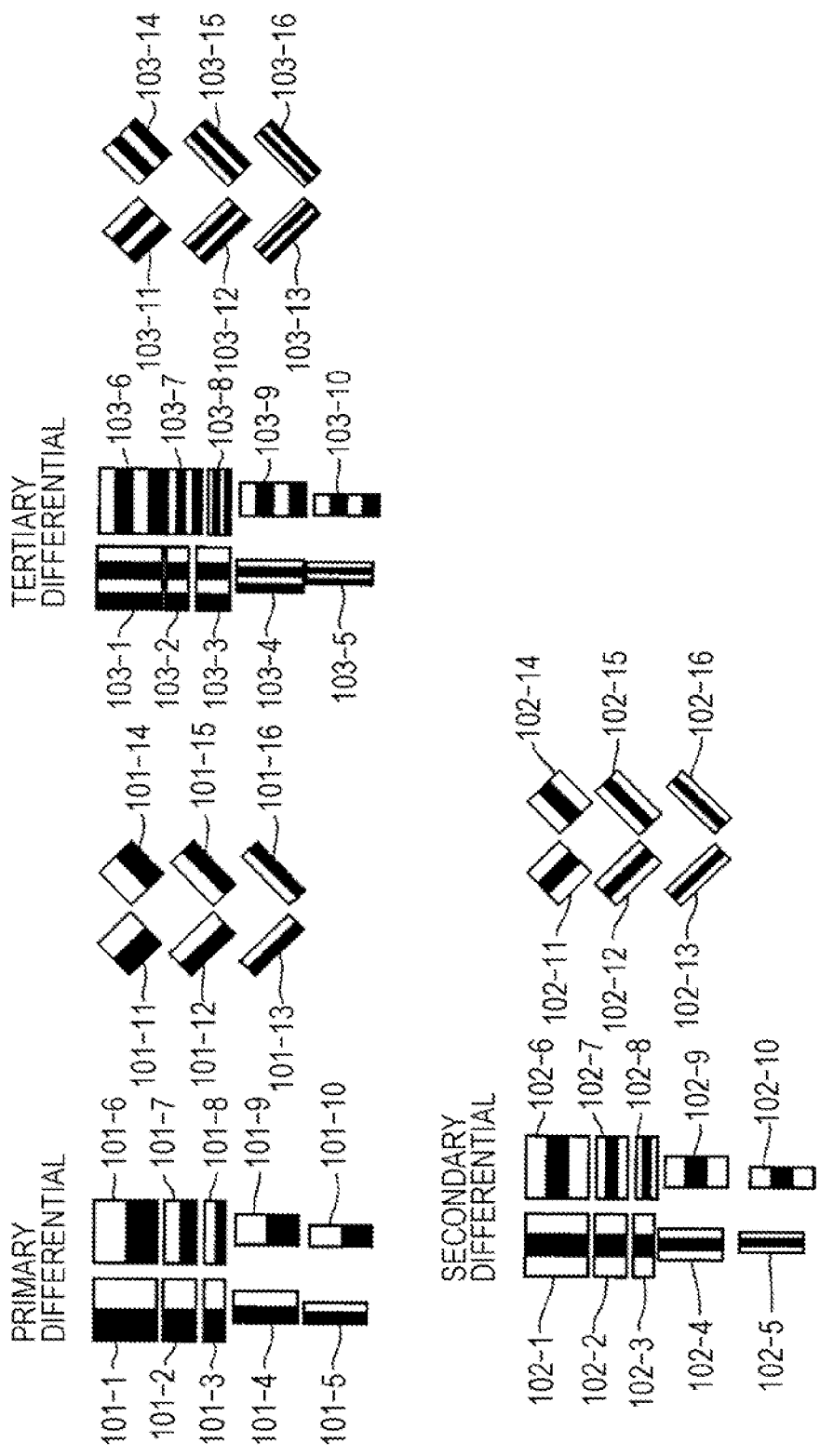
FIG. 4 is a diagram for describing a rectangular filter.

FIG. 4 is a diagram illustrating examples of other filters. Each of the filters illustrated in FIG. 4 is a filter in which rectangles are combined. In FIG. 4, filters 101-1 through 101-16 represent the primary differential functions $G_1$. Filters 102-1 through 102-16 represent the secondary differential functions $G_2$ as to the filters 101-1 through 101-16, respectively. Further, filters 103-1 through 103-16 represent the tertiary differential functions $G_3$ as to the filters 101-1 through 101-16, respectively.

The filter 101-1 is a filter having a predetermined size, and is a filter with the right side in the drawing as a white region, and with the left side in the drawing as a black region. Each of the filters 101-2 through 101-5 is a filter having a size different from the filter 101-1, but is a filter with the right side in the drawing as a white region, and with the left side in the drawing as a black region in the same way as the filter 101-1.

Note that the expressions of the white region and the black region are employed here, but do not mean that the expressions are restricted to white and black. That is to say, regions to be used as a filter should be regions having a different color, and there is no restriction regarding the color itself. Therefore, white and black will be described here as an example.

Also, a filter of which the white region and the black region are switched may be employed. For example, an arrangement may be made wherein the white region and the black region of the filter 101-1 are switched, and in the drawing, the left side is taken as the white region, and the right side is taken as the black region. However, with the present embodiment, the absolute value of a value calculated by a filter being applied is taken as a feature amount, which will be described later. Thus, this is arranged so that the same advantage as a case where both filters of a filter in which the regions have not been switched, and a filter in which the regions have been switched are applied can be obtained.

Each of the filters 101-6 through 101-10 is a filter having a different size, and is a filter with the upper side as a white region in the drawing, and with the lower side as a black region in the drawing. Each of the filters 101-11 through 101-13 is a filter having a different size, and is a filter having a diagonally left up shape in the drawing with the upper side as a white region in the drawing, and with the lower side as a black region in the drawing. Each of the filters 101-14 through 101-16 is a filter having a different size, and is a filter having a diagonally right up shape in the drawing with the upper side as a white region in the drawing, and with the lower side as a black region in the drawing.

Such filters 101-1 through 101-16 representing the primary differential function $G_1$ are suitable for extraction of edge components. With the filters 101-1 through 101-16, luminance average difference as to an adjacent region is calculated, and accordingly, which has implications, for example, such that there is an edge where the white region is changed to the black region.

The filter 102-1 is a filter having a predetermined size, and is a filter with the white region, black region, and white region in order from the left in the drawing. Each of the filters 102-2 through 102-5 is a file having a size different from the filter 102-1, but is a filter, in the same way as with the filter 102-1, with the white region, black region, and white region in order from the left in the drawing.

Each of the filters 102-6 through 102-10 is a filter having a different size, and is a filter with the white region, black region, and white region in order from the top in the drawing. Each of the filters 102-11 through 102-13 is a filter having a different size, and is a filter having a diagonally left up shape in the drawing with the white region, black region, and white region in order from the top in the drawing. Each of the filters 102-14 through 102-16 is a filter having a different size, and is a filter having a diagonally right up shape in the drawing with the white region, black region, and white region in order from the top in the drawing.

Such filters 102-1 through 102-16 representing the secondary differential function $G_2$ are suitable for extraction of bar components (bar-shaped components).

The filter 103-1 is a filter having a predetermined size, and is a filter with the black region, white region, black region, and white region in order from the left in the drawing. Each of the filters 103-2 through 103-5 is a file having a size different from the filter 103-1, but is a filter, in the same way as with the filter 103-1, with the black region, white region, black region, and white region in order from the left in the drawing.

Each of the filters 103-6 through 103-10 is a filter having a different size, and is a filter with the white region, black region, white region, and black region in order from the top in the drawing. Each of the filters 103-11 through 103-13 is a filter having a different size, and is a filter having a diagonally left up shape in the drawing with the white region, black region, white region, and black region in order from the top in the drawing. Each of the filters 103-14 through 103-16 is a filter having a different size, and is a filter having a diagonally right up shape in the drawing with the white region, black region, white region, and black region in order from the top in the drawing.

Such filters 103-1 through 103-16 representing the tertiary differential function $G_3$ are suitable for extraction of a shape like a person's leg.

Configuration of Identifier Generating Unit

Figure 5:
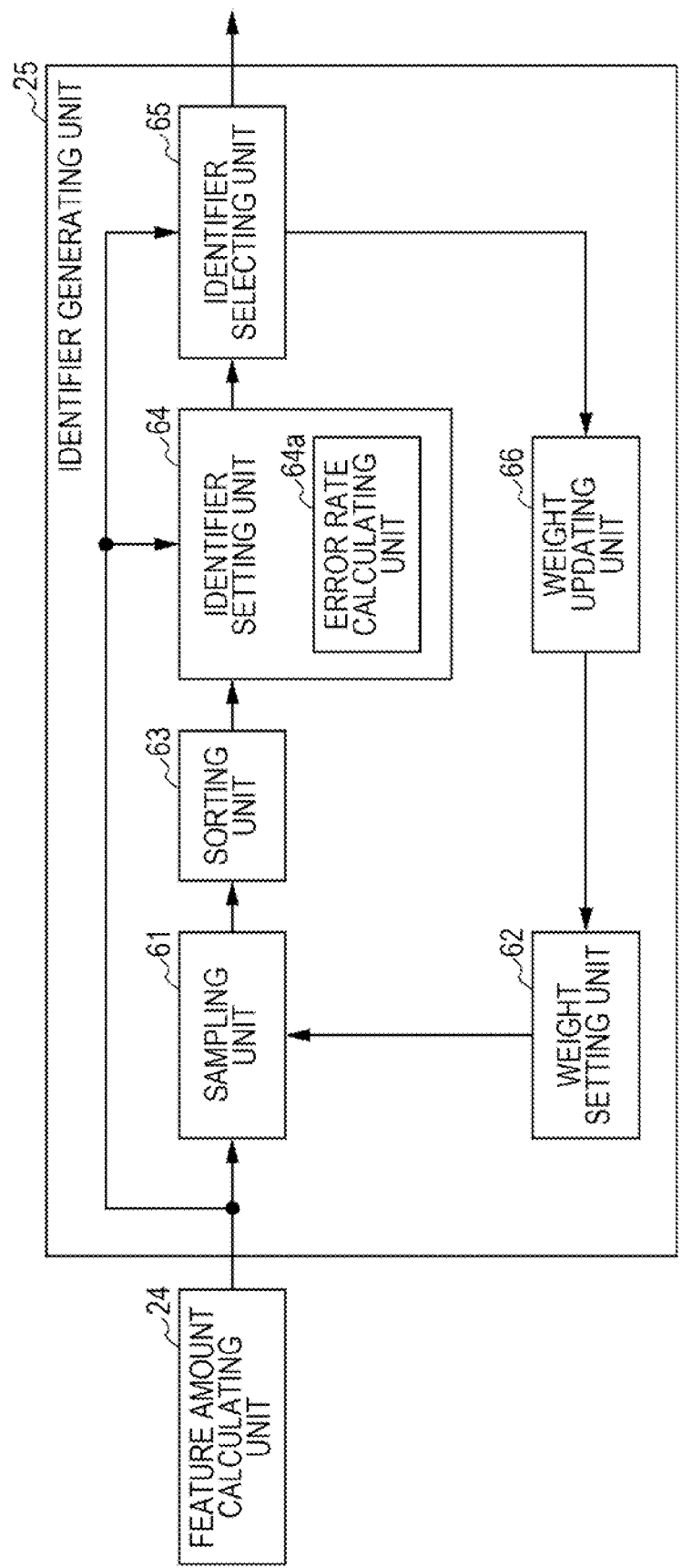
FIG. 5 is a diagram illustrating a detailed configuration example of an identifier generating unit.

FIG. 5 is a block diagram illustrating a more detailed configuration example of the identifier generating unit 25 in FIG. 1. The identifier generating unit 25 is configured of a sampling unit 61, a weight setting unit 62, a sorting unit 63, an identifier setting unit 64, an identifier selecting unit 65, and a weight updating unit 66.

The sampling unit 61 samples M feature amounts from the feature amounts of a pair of feature points in the same position as each of the multiple learning images for each pair of feature points in response to weight in increments of learning images to be set by the weight setting unit 62, and supplies these to the sorting unit 63.

The sorting unit 63 sorts the M sampled feature amounts in ascending or descending order regarding each pair of feature points, and supplies these to the identifier setting unit 64.

The identifier setting unit 64 controls, based on information of corrigenda indicating whether or not a target object to be recognized is included in the learning image from which the feature point has been extracted, the error rate calculating unit 64a to calculate an error rate while changing the threshold regarding each of the pairs of feature amounts sorted in ascending or descending order, and sets a threshold so that the error rate becomes the minimum (this threshold is set as a weak identifier). Further, the identifier setting unit 64 supplies the error rate for each weak identifier to the identifier selecting unit 65.

The learning image is appended with information of corrigenda (label) indicating whether or not a target object is included in the learning image thereof, and the identifier setting unit 64 performs setting of a weak identifier based on the information of corrigenda appended to the learning image supplied from the feature amount calculating unit 24.

The identifier selecting unit 65 selects, of weak identifiers, a weak identifier of which the error rate is the minimum, updates the identifier made up of the weak identifier, and supplies the feature amounts corresponding to the final identifier and each weak identifier to the identifier storage unit 12. Further, the identifier selecting unit 65 calculates reliability based on the error rate of the selected weak identifier, and supplies this to the weight updating unit 66.

The weight updating unit 66 recalculates weight for each learning image based on the supplied reliability, and also updates the weight by normalization, and supplies the updating result to the weight setting unit 62. The weight setting unit 62 sets the weight in increments of learning images based on the updating result of the weight supplied from the weight updating unit 66.

Learning Processing

Next, description will be added regarding the learning processing to be performed at the learning device 11. Upon a learning image being input to the learning device 11, and generation of an identifier being instructed, the learning device 11 starts the learning processing to generate an identifier by statistical learning. Hereafter, the learning processing by the learning device 11 will be described with reference to FIGS. 6 through 8.

In step S11, the multiple-resolution image generating unit 22 generates multiple resolution images from the input learning image. As described above, the multiple-resolution image generating unit 22 generates, for example, multiple resolution images of eight resolution hierarchies from level L1 through level L8, and supplies the generated images to the feature point extracting unit 23. The feature point extracting unit 23 executes the processing in step S11 and thereafter with one image of the supplied multiple resolution images (multiple images having a different resolution) as a learning image to be processed, and repeatedly executes the processing in step S11 and thereafter for every multiple images.

In step S12, the feature point extracting unit 23 extracts feature points from the input learning image. For example, in the event that the learning image illustrated in FIG. 9A has been input to the feature point extracting unit 23, the feature point extracting unit 23 extracts, as illustrated in FIG. 9B, pixels arrayed with a predetermined interval in the learning image as feature points. Note that, in FIG. 9B, circles on the learning image represent pixels determined to be feature points.

Figure 9A:
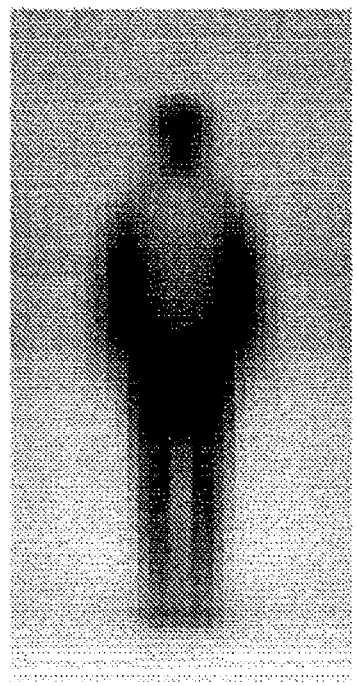
FIGS. 9A and 9B are diagrams for describing generation of an identifier.
Figure 9B:
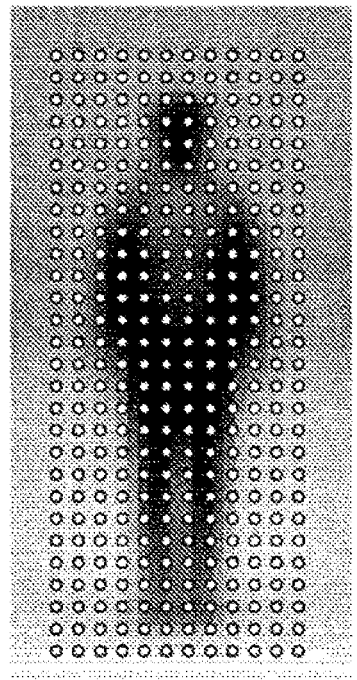

The learning images illustrated in FIGS. 9A and 9B are learning images made up of 32 pixels in the horizontal direction and 64 pixels in the vertical direction in the drawing, and the feature point extracting unit 23 selects pixels on the learning image as pixels serving as feature points with two pixel interval in the horizontal direction and in the vertical direction. Thus, with the learning image, 12 pixels in the horizontal direction, 28 pixels in the vertical direction, and a total of 226 (=12×28) pixels are selected as feature points in the drawing.

After extracting feature points from the learning image, the feature point extracting unit 23 supplies the extracted feature points and the input learning image to the feature amount calculating unit 24.

In step S13, the feature amount calculating unit 24 performs feature amount calculating processing to calculate the feature amount of each feature point based on the feature points and learning image supplied from the feature point extracting unit 23. Now, the feature amount calculating processing corresponding to the processing in step S13 will be described with reference to the flowchart in FIG. 8.

In step S51, the feature amount calculating unit 24, more in detail, each of the primary filter processing unit 51, secondary filter processing unit 52, and tertiary filter processing unit 53 of the feature amount calculating unit 24 selects, of the feature points supplied from the feature point extracting unit 23, one unprocessed feature point as a pixel of interest. At this time, the filter which each of the primary filter processing unit 51, secondary filter processing unit 52, and tertiary filter processing unit 53 employs may be the filter illustrated in FIG. 3, or may be the filter illustrated in FIG. 4. Alternatively, both may be employed.

In step S52, the feature amount calculating unit 24 sets a counter q indicating a direction $\theta q$ to 1. Thus, the direction $\theta q$ is set to $\theta 1$.

In step S53, the primary filter processing unit 51 performs primary filter processing. Specifically, the primary filter processing unit 51 calculates Expression (2) with the Gaussian width as $\sigma=1$, and the direction as $\theta q$ based on the pixel value of the pixel of interest serving as a processing object, and supplies the results of the filter processing to the feature amount generating unit 54. That is to say, calculation is performed with the direction $\theta$ in Expression (2) as $\theta q$, and an outline is extracted.

Note that description has been made with the Gaussian width as $\sigma=1$, but in the event of the present embodiment, the Gaussian width is fixed to $\sigma=1$ (the filter of one Gaussian width has been set beforehand), whereby processing with the Gaussian width as $\sigma=1$ may be omitted. That is to say, with the present embodiment, processing for calculating Expression (2) with the direction of a filter of which the Gaussian width is 1 as $\theta q$ is executed in step S53. Also, description will be continued with the Gaussian width as $\sigma=1$, but it goes without saying that the Gaussian width of the filter prepared beforehand may be a Gaussian width other than $\sigma=1$.

In step S54, the secondary filter processing unit 52 performs secondary filter processing. Specifically, the secondary filter processing unit 52 calculates Expression (3) with the direction of the filter of the Gaussian width $\sigma=1$ as $\theta q$ based on the pixel value of the pixel of interest, and supplies the results of the filter processing to the feature amount generating unit 54. That is to say, calculation is performed with the direction $\theta$ in Expression (3) as $\theta q$, and an outline is extracted.

In step S55, the tertiary filter processing unit 53 performs tertiary filter processing. Specifically, the tertiary filter processing unit 53 calculates Expression (5) with the direction of the filter of the Gaussian width σ=1 as θq based on the pixel value of the pixel of interest, and supplies the results of the filter processing to the feature amount generating unit 54. That is to say, calculation is performed with the direction θ in Expression (5) as θq, and an outline is extracted.

In step S56, the feature amount calculating unit 24 determines whether or not the direction θq is θ4, i.e., whether or not the counter q=4. In the event that determination is made in step S56 that the direction θq is not θ4, in step S57 the feature amount calculating unit 24 increments the counter q. For example, in the event that the counter q=1, the counter q is incremented to q=2, and thus, the direction θq is set to θ2. Upon the counter q being incremented, the processing returns to step S53, and the above processing is repeated.

On the other hand, in the event that determination is made in step S56 that the direction θq is θ4, in step S58 the feature amount generating unit 54 synthesizes the calculation results supplied from the primary filter processing unit 51, secondary filter processing unit 52, and tertiary filter processing unit 53 as feature amounts, and generates the feature amount as to one feature point.

The feature amount is obtained by the following Expression (7) or Expression (8).

$$v_j = \sum_{x,y} |G_{d,\theta} \otimes I(x_i y_i, s_i)| \tag{7}$$

$$v_j = \max_{x,y} |G_{d,\theta} \otimes I(x_i, y_i s_i)| \tag{8}$$

With Expression (7) and Expression (8), $G_{d,\theta}$ is the d'th differential function of the Gaussian function G with an arbitrary angle θ in the same way as with Expression (2). Also, of $I(x_i, y_i, s_i)$, $(x_i, y_i)$ represents coordinates within the image of a feature point serving as a processing object, and $(s_i)$ represents, of images making up the multiple resolution images, the scale of the image serving as the processing object.

The Expression (7) is an expression for subjecting the d'th differential function of the Gaussian function G and the feature amount in the arbitrary angle θ to convolution operation, and calculating the summation of the absolute values thereof by Σ. The Expression (8) is an expression for subjecting the d'th differential function of the Gaussian function G and the feature amount in the arbitrary angle θ to convolution operation, and calculating the maximum value of the absolute values thereof by max.

The Expression (7) and Expression (8) are both expressions for calculating a feature amount, but Expression (7) is an expression for calculating local energy, and Expression (8) is an expression for calculating a local maximum value. Now, description will be added regarding the meanings of these expressions.

According to processing such as described above, a detection identifier can be generated, which performs statistical learning with a tutor with the filter coefficient extracted by the function and scale in the arbitrary angle as a feature amount to detect a target object such as a person or the like. However, with this detection identifier, for example, a feature amount dependent on relationship between clothes worn by a person and background is obtained. Also, with regard to an authentication object of which the distortion or deformation is great such as a person, selectivity is excessive as a feature amount. Accordingly, the processing has to be performed by absorbing these, and each of the feature amounts has to be converted into a feature amount having constancy.

Calculating the absolute value of an output value after the filter processing can solve conversion of a feature amount dependent on relationship between clothes worn by a person and background, into a feature amount having constancy. A feature amount approximate to a person's outline can be extracted by calculating the absolute value. Further, with the present embodiment, the primary differential function, secondary differential function, and tertiary differential function are calculated, each of which performs calculation of an absolute value. Thus, precision can be improved as compared to a case where calculation is performed only with the absolute value by the primary differential function, and a feature amount having constancy can be calculated.

Also, in order to solve the above-mentioned problem wherein with regard to an authentication object of which the distortion or deformation is great such as a person, selectivity is excessive as a feature amount, a feature amount absorbing such a problem can be calculated by performing invariant calculation due to position shift. The invariant calculation due to position shift is a calculation taking advantage of that when detecting the outline of a person's face, the length of the outline thereof is generally the same regardless of the face shape. In other words, this calculation is a calculation wherein when paying attention to a predetermined portion of the outline, even if the portion thereof is positionally shifted, for example, when the outline of an almost moonfaced person is positionally moved so as to be overlapped with the outline of an elongated face, only the position is shifted, but the value of the length thereof or the like is regarded to be constancy.

As such a calculation, the summation is calculated such as Expression (7). According to the summation being calculated, for example, the summation of the outlines of a person's face is calculated. Also, such as Expression (8), the maximum value is calculated. According to the maximum value being calculated, for example, the maximum value of the outlines of a person's face is calculated.

Here, the two calculations for obtaining such as the summation and the maximum value have been shown. In other words, as described above, the calculation for obtaining local energy based on Expression (7), and the calculation for obtaining a local maximum value based on Expression (8) have been shown. In addition to these, a calculation for obtaining local energy around a point having a local maximum value may be performed. This is an image to perform calculation of Expression (7) in response to the calculation results of Expression (8). Also, a calculation for obtaining the maximum value around local energy may be performed. This is an image to perform calculation of Expression (8) in response to the calculation results of Expression (7). Though not shown a specific expression, a feature amount may be calculated by such a calculation.

Now, description will be further added regarding calculation of a feature point, with reference to FIG. 10. Let us say that the image 201 illustrated in FIG. 10 is an image serving as a processing object. This image 201 is an image serving as a learning object at the time of learning, and is an image serving as a recognition object at the time of recognition. The result obtained by the image 201 being subjected to the filtering processing at the filter 101-1 is an image 202.

This image 202 is an image to which the feature amount calculated by the following Expression (9) has been reflected.

$$v_j = G_{d,\theta} \otimes I(x_i, y_i, s_i) \tag{9}$$

The Expression (9) is an expression wherein neither the summation nor the absolute value is calculated in Expression (7).

An image 203 is an image to which as the results of the calculation based on the following Expression (10), the calculated feature amount has been reflected.

$$v_j = |G_{d,\theta} \otimes I(x_i, y_i, s_i)| \qquad (10)$$

The Expression (10) is an expression for calculating the absolute value of the calculation result of Expression (9).

The image 203 is an image equivalent to a case where the processing has been performed using a filter 101-1' obtained by the region of the filter 101-1 used at the time of generating the image 202 being inverted. The filter 101-1' is a filer with the left image in the drawing as a white region, and with the right image in the drawing as a black region, and is a filter obtained by inverting the region of the filter 101-1.

An image to which the feature amount calculated based on an expression for calculating no absolute value based on Expression (9) by applying the filter 101-1 has been reflected becomes, for example, the image 202 from which a portion (outline) where the color is changed from white to black. An image to which the feature amount calculated based on an expression for calculating an absolute value based on Expression (10) by applying the filter 101-1' has been reflected becomes, for example, the image 203 from which a portion (outline) where the color is changed from black to white. Thus, though only the directions differ, the same outline can be extracted.

Further, the image 204 illustrated in FIG. 10 is an image to which the result (feature amount) obtained by calculating the summation of the values calculated for each filter by calculation based on Expression (7) by applying the multiple filters 101-1 has been reflected. Though the multiple filters 101-1 have been described, this indicates that the same filter 101-1 is applied to multiple positions (pixels). In other words, in the event that the filter 101-1a has been applied to a predetermined pixel a, calculation to which the filter 101-1 is applied is performed as to each of pixels b through f positioned in the neighborhood of the pixel a thereof. Here, in order to distinguish a filter to be applied to a different position, a subscript from a through f is described by being appended thereto.

The filter 101-1a is applied, calculation based on Expression (10) is performed, and a feature amount A is calculated. Similarly, the filer 101-1b is applied, calculation based on Expression (10) is performed, a feature amount B is calculated, the filer 101-1c is applied, calculation based on Expression (10) is performed, and a feature amount C is calculated.

Further, similarly, the filter 101-1d is applied, calculation based on Expression (10) is performed, a feature amount D is calculated, the filter 101-1e is applied, calculation based on Expression (10) is performed, a feature amount E is calculated, the filter 101-1f is applied, calculation based on Expression (10) is performed, and a feature amount F is calculated. The feature amounts A through F thus calculated are added, whereby a feature amount is calculated. This added feature amount is taken as a feature amount as to the pixel a serving as a reference.

Note that description has been made here wherein the added feature amount (i.e., summation) is taken as a feature amount as to the pixel a serving as a reference, but the added feature amount may be a value divided by the number of feature points serving as processing objects, i.e., the average value may be taken as a feature point.

Such a feature point is a feature point that is strong against position shift, rotation, change in size, and so forth. In this case, a filter is applied to a different position, whereby each of the feature points is calculated, but each of the feature points becomes, for example, a feature point for extracting the outline of a predetermined object within an image. An outline is extracted for each different position, and thus, the outline itself provides blurred feeling. Position shift, rotation, change in size, and so forth can be absorbed by taking advantage of this blurred degree, and a feature amount strong against position shift, rotation, change in size, and so forth can be obtained.

With the description reference to FIG. 10, a case where Expression (10) is applied has been described as an example, but even in the event of applying Expression (8), a feature amount can be calculated in the same way as with the above-mentioned case, and accordingly, description thereof will be omitted.

Figure 7:
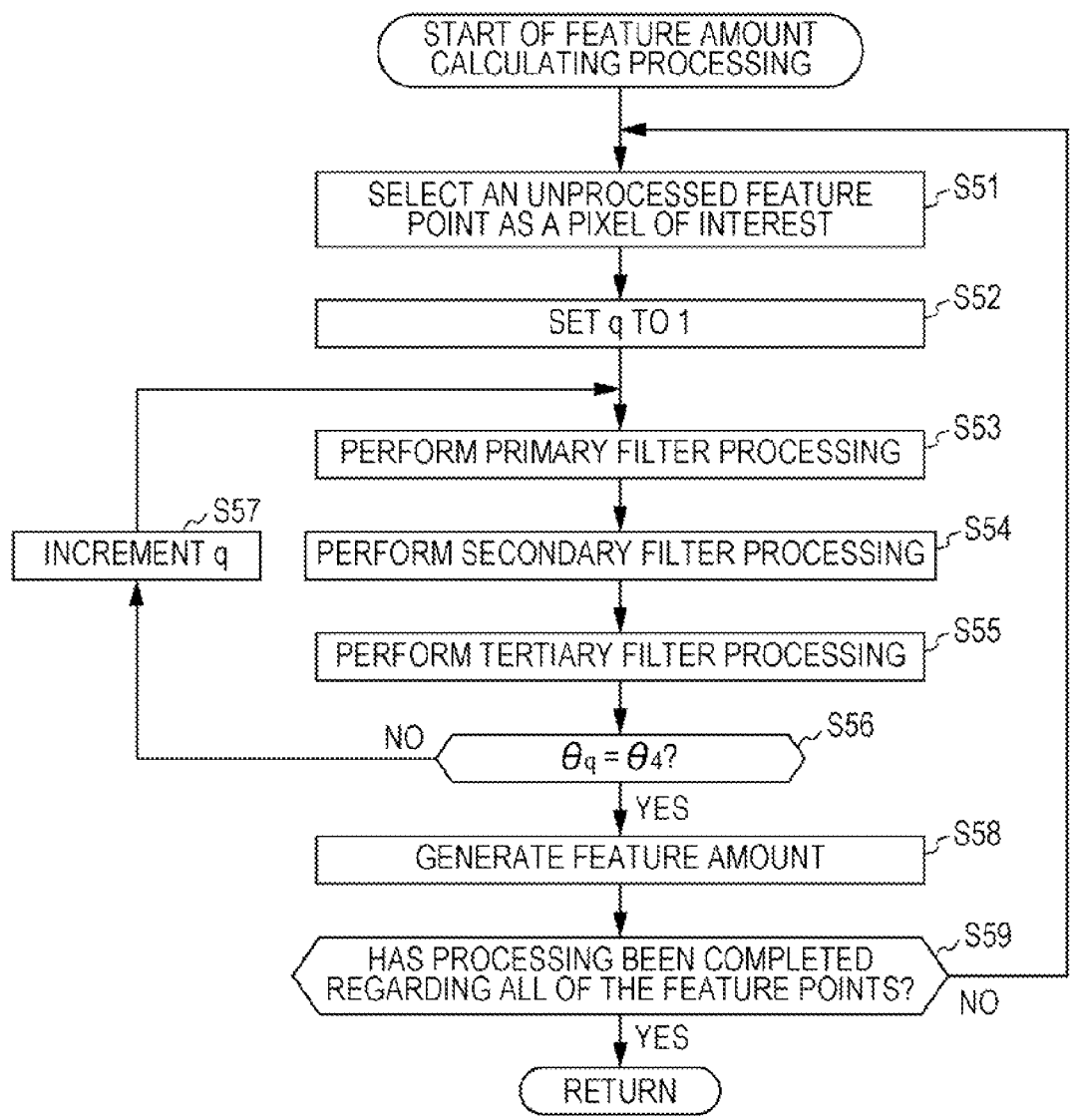
FIG. 7 is a flowchart for describing feature amount calculating processing.
Figure 8:
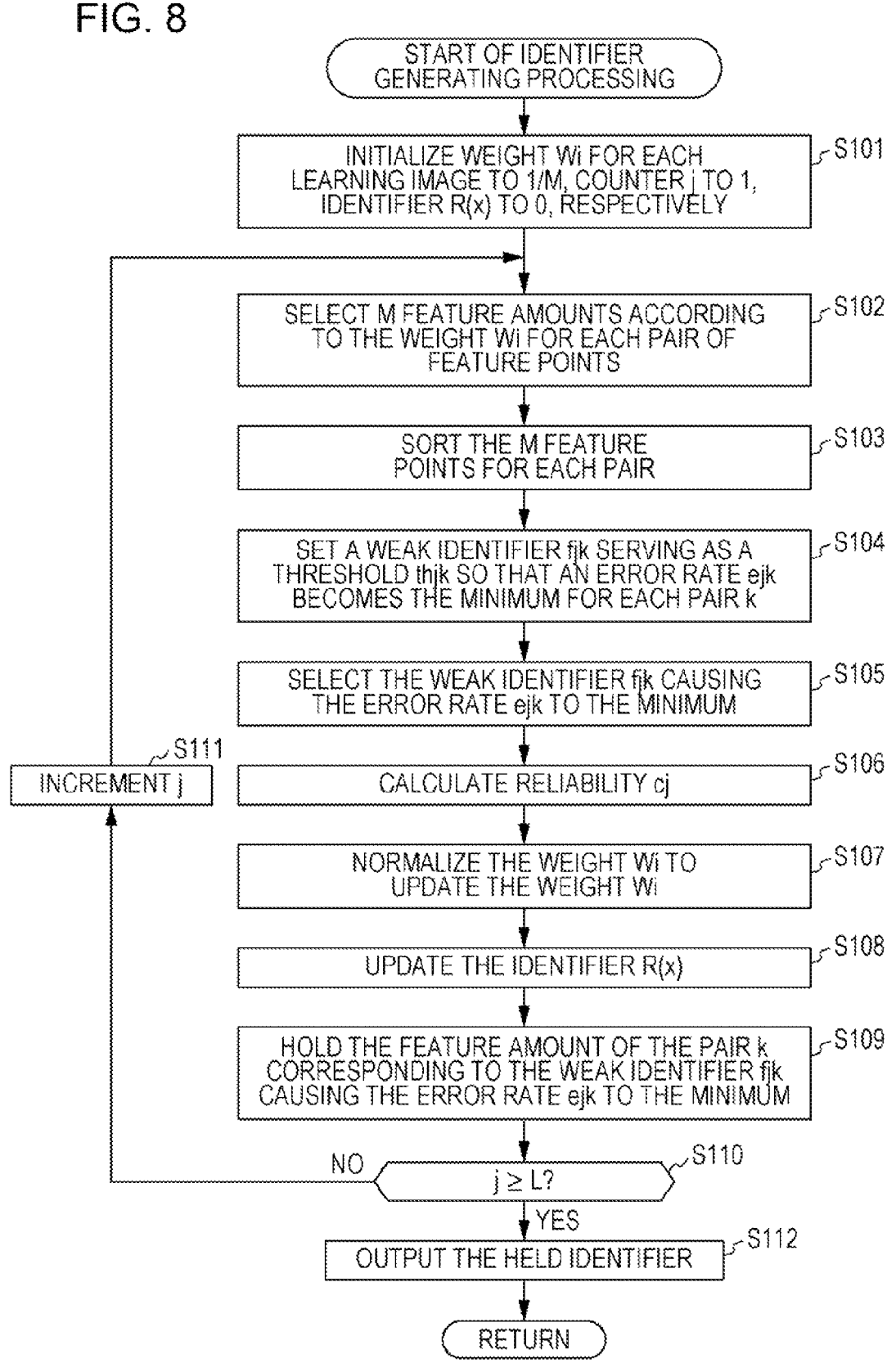
FIG. 8 is a flowchart for describing identifier generating processing.

Description will return to the flowchart illustrated in FIG. 7. In step S58, the feature amount is calculated from each feature point by such a calculation. Subsequently, in step S59, the feature amount calculating unit 24 determines whether or not the processing has been completed regarding all of the feature points. For example, in the event that the feature points have been obtained regarding all of the feature points supplied from the feature point extracting unit 23, determination is made that the processing ends.

In the event that determination is made in step S59 that the processing has not been completed regarding all of the feature points, the processing returns to step S51, where the next feature point is selected as a pixel of interest.

On the other hand, in the event that determination is made in step S59 that the processing has been completed regarding all of the feature points, the feature amount generating unit 54 supplies the learning image supplied from the feature point extracting unit 23, and the feature amount of each generated feature point to the identifier generating unit 26. Subsequently, the processing proceeds to step S14 in FIG. 6.

Note that, not only a steerable filter but also a Gabor filter may be employed for extraction of a feature point from a learning image.

Figure 6:
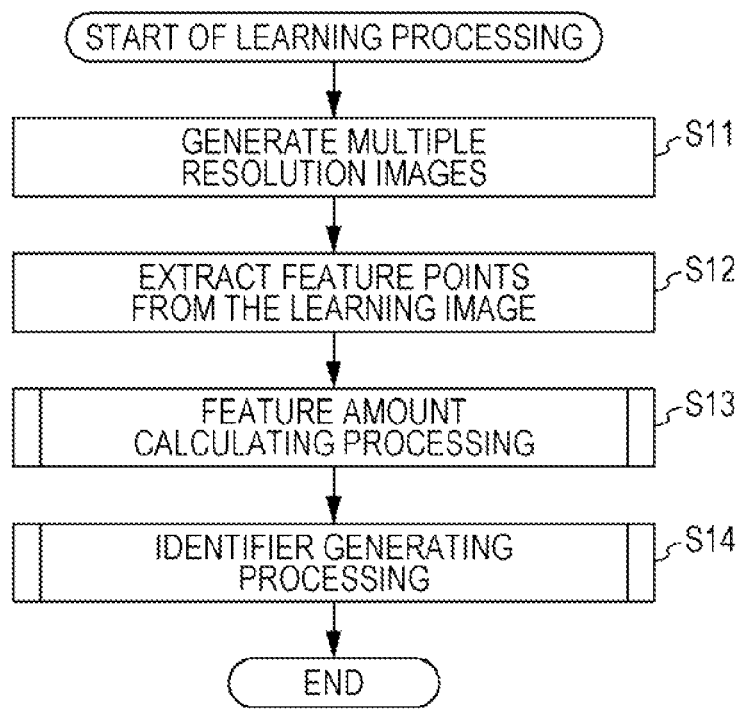
FIG. 6 is a flowchart for describing learning processing.

Description will return to the flowchart in FIG. 6, where upon the feature amount of each feature point being obtained, in step S14 the identifier generating unit 26 performs identifier generating processing based on the learning image and feature amount supplied from the feature amount calculating unit 24 to generate an identifier. The identifier generating processing to be executed in step S14 will be described with reference to the flowchart in FIG. 8.

In step S101, the weight setting unit 62 initializes, for example, all of weights Wi for each learning image $PI_i$ ($1 \leq i \leq M$) illustrated in FIGS. 11 to 1/M, and the identifier selecting unit 65 initializes a counter j to 1, and an identifier R(x) made up of the summation of weak identifiers to 0, respectively.

Here, i is a variable for identifying the learning images $PI_i$ in FIG. 11, and is in a range of $1 \leq i \leq M$. According to the processing in step S101, the weights Wi of all of the learning images $PI_i$ are set to the same normalized weight (=1/M). Also, the counter j indicates a predetermined number of times of updating the identifier R(x).

In step S102, the sampling unit 61 selects M feature amounts from the feature amounts of a pair of feature points in the same position of each of the multiple learning images $PI_i$ for each pair of feature points, according to the weights Wi of the learning images $PI_i$, and supplies these to the sorting unit 63.

Figure 12:
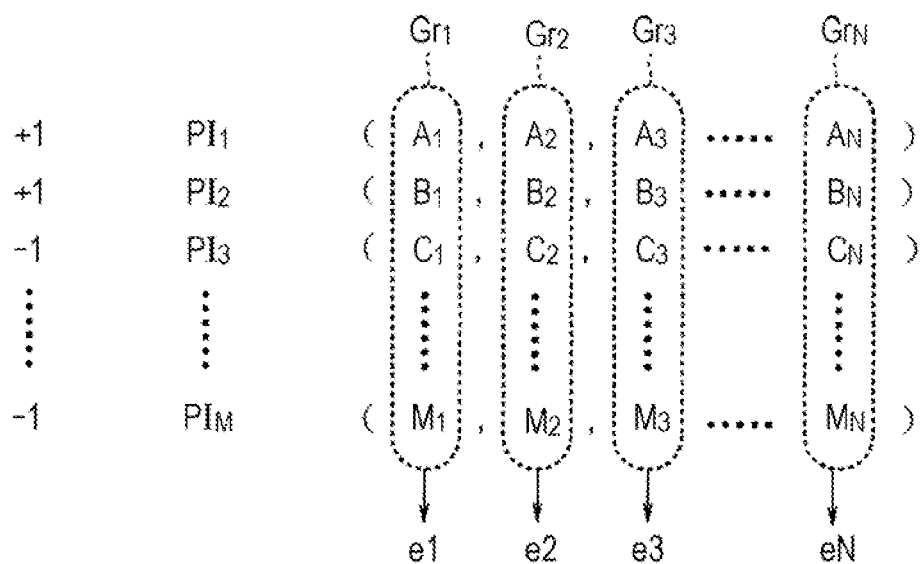
FIG. 12 is a diagram for describing sampling of a feature amount for each pair of feature points.

For example, let us say that the feature amounts of M learning images $PI_1$ through $PI_M$ are supplied from the feature amount calculating unit 24 to the sampling unit 61 as illustrated in FIG. 12. In FIG. 12, the feature points obtained from the leaning images $PI_i$ (where $1 \leq i \leq M$) are arrayed in the horizontal direction in the drawing, and a number "+1" or "−1" on the left side in the drawing of letters $PI_i$ representing a learning image indicates a label (information of corrigenda) added to the learning image $PI_i$ thereof.

Specifically, each of $(A_1, A_2, A_3, \ldots, A_N)$ arrayed in the horizontal direction on the topmost side in the drawing represents the feature amount of each pair of feature points of the learning image $PI_1$, and the number "+1" on the left side in the drawing of the letters "$PI_1$" indicating the learning image $PI_1$ represents a label to the effect that the learning image $PI_1$ includes a target object.

Similarly, each of $(B_1, B_2, B_3, \ldots, B_N)$ arrayed in the second horizontal direction from the top in the drawing represents the feature amount of each pair of feature points of the learning image $PI_2$, and the number "+1" on the left side in the drawing of the letters "$PI_2$" indicating the learning image $PI_2$ represents a label to the effect that the learning image $PI_2$ includes a target object.

Also, each of $(C_1, C_2, C_3, \ldots, C_N)$ arrayed in the third horizontal direction from the top in the drawing represents the feature amount of each pair of feature points of the learning image $PI_3$, and the number "−1" on the left side in the drawing of the letters "$PI_3$" represents a label to the effect that the learning image $PI_3$ includes no target object. Further, each of $(M_1, M_2, M_3, \ldots, M_N)$ arrayed in the M'th horizontal direction from the top in the drawing represents the feature amount of each pair of feature points of the learning image $PI_M$, and the number "−1" on the left side in the drawing of the letters "$PI_M$" represents a label to the effect that the learning image $PI_M$ includes no target object.

In this way, with the example in FIG. 12, the feature amount of each of N pairs of feature points is obtained from one learning image $PI_i$. Also, in FIG. 12, M feature amounts $A_k$ through $M_k$ (where $1 \leq k \leq M$) arrayed in the vertical direction are taken as one group $Gr_k$, and the feature amounts belonging to this group $Gr_k$ are taken as the feature amount of a pair of feature amounts in the same position of each learning image $PI_i$.

For example, the group $Gr_1$ is made up of the feature amount $A_1$ through the feature amount $M_1$ arrayed in the vertical direction, and two feature points serving as a pair of the learning image $PI_1$ whereby the feature amount $A_1$ is obtained, and other feature amounts belonging to the group $Gr_1$, e.g., two feature points serving as a pair of the learning image $PI_M$ whereby the feature amount $M_1$ is obtained are positioned in the same position of the learning image. Now, hereafter, a pair of feature points in each learning image $PI_i$, which is a pair whereby feature amounts belonging to the group $Gr_k$ ($1 \leq k \leq M$) are obtained, will be referred to as a pair k.

In the event that the feature amounts for each of the learning image $PI_i$ illustrated in FIG. 12 have been supplied to the sampling unit 61, the sampling unit 61 selects M feature amounts by lot for each pair k, i.e., for each group $Gr_k$, from the feature amounts belonging to the group thereof, according to the weight Wi of the learning image $PI_i$. For example, the sampling unit 61 selects M feature amounts from the feature amount $A_1$ through the feature amount $M_1$ belonging to the group $Gr_1$ according to the weight Wi. Note that, with the first processing, any of the weights Wi is equally 1/M, and accordingly, upon M feature amounts being selected by lot, all of the feature amounts are stochastically selected. Therefore, now, let us say that with the first processing, all of the feature amounts have been selected in each group $Gr_k$. It goes without saying that, in reality, the same feature amount may redundantly be selected.

Note that the weight Wi may be employed for an error calculation for each pair of feature points. In this case, an error calculation is performed by the data weight coefficient (weight Wi) being multiplied by an error value.

In step S103, the sorting unit 63 sorts the M feature amounts selected for each group $Gr_k$, i.e., for each pair k in ascending order or in descending order regarding each of the N groups $Gr_k$, and supplies these to the identifier setting unit 64. For example, M feature amounts selected from the feature amounts belonging to the group $Gr_1$ in FIG. 12 are sorted in order.

In step S104, the identifier setting unit 64 controls the error rate calculating unit 64a while changing a threshold for each group $Gr_k$, i.e., for each pair k of feature points based on the information of corrigenda (label) appended to the learning image supplied from the feature amount calculating unit 24 to calculate an error rate $e_{jk}$ as illustrated in the following Expression (11), and sets the threshold so that the error rate $e_{jk}$ becomes the minimum.

Here, a threshold $th_{jk}$ for each pair k of feature points becomes one weak identifier $f_{jk}$. The identifier setting unit 64 supplies the error rate $e_{jk}$ for each weak identifier $f_{jk}$ to the identifier selecting unit 65. That is to say, N weak identifiers $f_{jk}$ are set to N pairs k respectively, and the error rates $e_{jk}$ are obtained regarding the N weak identifiers $f_{jk}$ respectively. Note that the weak identifiers $f_{jk}$ are functions for outputting "+1" in the event that a target object to be recognized is included, and outputting "−1" in the event that a target object to be recognized is not included.

Figure 13:
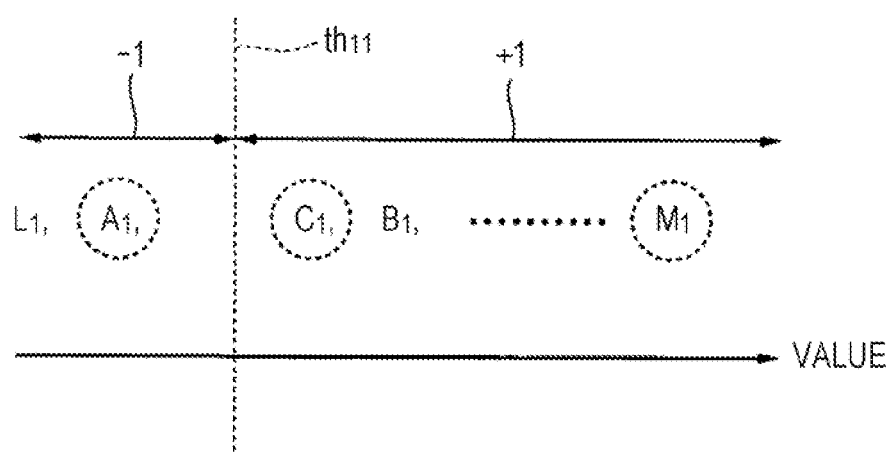
FIG. 13 is a diagram for describing setting of a weak identifier.

For example, as illustrated in FIG. 13, in the event that j=1, and the feature amounts of the pair k=1 of feature points are arrayed in ascending order or descending order of $L_1, A_1, C_1, B_1, \ldots, M_1$, the threshold $th_{11}$ is set between the feature amounts $A_1$ and $C_1$. Subsequently, when it is recognized that there is no target object to be recognized in a range smaller than the threshold $th_{11}$ (range indicated with "−1"), and it is recognized that there is a target object to be recognized in a range greater than the threshold $th_{11}$ (range indicated with "+1"), the feature amount $A_1$ surrounded with a dotted line in the drawing is a feature amount of the learning image including the target object to be recognized, so is regarded as an error. Also, conversely, the feature amounts $C_1$ and $M_1$ are feature amounts of the learning image including no target object to be recognized, and accordingly are regarded as errors.

With the example in FIG. 13, the threshold $th_{11}$ is set to a position where the error rate $e_{jk}$ becomes the minimum. For example, in the event that the threshold $th_{11}$ illustrated in FIG. 13 is not set to the position where the error rate $e_{jk}$ becomes the minimum, the identifier setting unit 64 changes the position of the threshold $th_{11}$, finds out the position of the threshold $th_{11}$ where the error rate $e_{jk}$ becomes the minimum while referencing the error rate $e_{jk}$ in each position, and takes the position thereof as the position of the threshold $th_{11}$.

The error rate calculating unit 64a adds the weight Wi of the learning image from which a feature amount regarded as an error has been extracted based on the information of corrigenda (label) of the learning image as illustrated in the following Expression (11) to calculate the error rate $e_{jk}$.

$$E_{jk} = E_w[1(y \neq f_{jk})] \quad (11)$$

Here, $y \neq f_{jk}$ indicates the condition of the pair k of feature points regarded as an error, and $E_w$ indicates that the weight in the pair k where an error has occurred is added.

In step S105, the identifier selecting unit 65 selects a weak identifier $f_{jk}$ where the error rate $e_{jk}$ becomes the minimum of the N weak identifiers $f_{jk}$ based on the N error rates $e_{jk}$ for each pair k supplied from the identifier setting unit 64. Subsequently, the identifier selecting unit 65 obtains the selected weak identifier $f_{jk}$ from the identifier setting unit 64.

In step S106, the identifier selecting unit 65 calculates reliability $c_j$ illustrated in the following Expression (12) base on the error rate $e_{jk}$ of the selected weak identifier $f_{jk}$, and supplies the calculating result to the weight updating unit 66.

$$c_j = \log((1-e_j)/e_j) \quad (12)$$

Note that, in Expression (12), $e_j$ indicates, of the error rates $e_{jk}$, the error rate $e_{jk}$ of the selected weak identifier $f_{jk}$, i.e., the minimum error rate $e_{jk}$ of the N error rates $e_{jk}$. Also, hereafter, the weak identifier of the pair k selected in the processing in step S105 will also be referred to as "weak identifier $f_j$", and the error rate $e_{jk}$ of the weak identifier $f_j$ thereof will also be referred to as "error rate $e_j$".

In step S107, the weight updating unit 66 recalculates the weight Wi for each of the learning images $PI_i$ by calculating the following Expression (13) based on the supplied reliability $c_j$, and also updates all of the weights Wi by normalization, and supplies the updating results to the weight setting unit 62. The weight setting unit 62 sets the weight for each learning image based on the updating results of the weights supplied from the weight updating unit 66.

$$Wi = Wi \exp[-c_j \cdot 1(y \neq f_j)], i=1, 2, \ldots, N \quad (13)$$

Expression (13) indicates that the weight Wi of the learning image including a feature amount where an error has occurred increases.

In step S108, the identifier selecting unit 65 uses the newly obtained weak identifier $f_j$ to update the held identifier R(x). Specifically, the identifier selecting unit 65 updates the identifier R(x) by calculating the following Expression (14).

$$R(x) = R'(x) + c_j \times f_j(x) \quad (14)$$

In Expression (14), R'(x) represents the identifier before updating held in the identifier selecting unit 65, and $f_j(x)$ represents the newly obtained weak identifier $f_j$. That is to say, the identifier selecting unit 65 adds the newly obtained weak identifier, weighted by being multiplied by the reliability $c_j$, to the held identifier, thereby updating the identifier.

In step S109, the identifier selecting unit 65 holds the feature amounts of the pair k of feature points corresponding to the weak identifier $f_{jk}$ where the error rate $e_{jk}$ becomes the minimum, as feature amounts for identification.

In step S110, the identifier selecting unit 65 determines whether or not the counter j is equal to or greater than L. In the event that determination is made in step S110 that the counter j is smaller than L, in step S111 the identifier selecting unit 65 increments the counter j. Subsequently, the processing returns to step S102, and the above-mentioned processing is repeated.

Specifically, new weak identifier $f_{jk}$ are set regarding the N pairs k using the newly obtained weight Wi for each learning image, and from these weak identifiers $f_{jk}$, weak identifiers $f_{jk}$ where the error rate $e_{jk}$ becomes the minimum are selected. Subsequently, the identifier is updated by the selected weak identifiers $f_{jk}$.

On the other hand, in the event that determination is made in step S110 that the counter j is equal to or greater than L, in step S112 the identifier selecting unit 65 outputs the held identifier and feature amounts for identification to the identifier storage unit 12.

According to the above processing, the identifier made up of the L weak identifiers ($1 \leq j \leq L$) of which the error rates are relatively low is supplied to the identifier storage unit 12, and also the feature amounts of the pair k of feature points to be used at each of the weak identifiers $f_j$ are supplied to the identifier storage unit 12. Here, L is $L \leq N$.

Note that in the event that the identifier of Expression (14) is used to generate an identifier (function) to output "+1" when the identifier for which a feature amount has been substituted is positive, and to output "−1" when the identifier is negative, we can say that the identifier thereof is a function for outputting whether or not a target object to be recognized is included, by majority vote of the L weak identifiers. Also, the learning processing for generating an identifier by repeating adding of a weak identifier while subjecting the weak identifier to weighting to generate an identifier, which has been described with reference to the flowchart in FIG. 7, is referred to as Discrete Adaboost Algorithm.

Specifically, according to the above identifier generating processing, processing for calculating a weak identifier and an error rate for each pair of feature points is repeated so that the weights of the feature amounts of a learning image having a high error rate sequentially increase, and the weights of the feature amounts having a low error rate decreases. Accordingly, within the repetitive processing (processing in steps S102 through S111), the feature amount to be selected at the time of setting a weak identifier (feature amount selected in step S102) gradually tends to be readily selected if it has a high error rate, and accordingly as feature amounts that are difficult to be recognized are repeatedly selected, the learning is repeated, and accordingly, the feature amounts of a learning image that is difficult to be recognized are frequently selected, and finally a high recognition rate can be obtained.

Also, within the repetitive processing (processing in steps S102 through S111), the identifier selecting unit 65 constantly selects a weak identifier corresponding to a pair having the lowest error rate, so according to repetition of the learning processing, a weak identifier regarding a pair of feature points having the highest reliability is constantly selected and added to the identifier, a weak identifier having a high precision is sequentially added each time the learning processing is repeated.

Further, the identifier is an identifier for identifying whether or not a person serving as a target object is included in an image using feature amounts. A pair of feature points corresponding to feature amounts to be substituted for each weak identifier making up the identifier is, of the pairs of feature points, a pair for suitable for detecting a target object from an input image.

As described above, an input image is converted into different-resolution images, the different-resolution images are subjected to filter processing, whereby calculation efficiency can be improved, and the processing speed can be improved. Thus, for example, a target object such as a person or the like can be recognized in real time.

For example, in the event that images of multiple scales are subjected to processing employing multiple filters, a great number of filter calculations have to be performed, and consequently, there is a possibility that the processing time and throughput may increase. However, with the present embodiment, images of multiple scales are subjected processing employing one filter, in other words, convolution is saved to one scale, and the processing can be performed without a great number of calculations, and accordingly, the processing speed can be improved.

Also, in the case of a multi-scale filter, when frequency becomes low (Gaussian width σ increases), it takes time to perform a convolution operation, but according to the present embodiment, as described above, a filter can be made up of one Gaussian width, multiple Gaussian-width filters do not have to be prepared, and a calculation does not have to be performed with multiple Gaussian-width filters. Accordingly, according to the present embodiment, even if processing is performed by preparing only one highest high-frequency filer, the processing speed can be far improved as compared to the case of a multi-scale filter.

Case of Using Region Average Difference Value as Filter

Description has been made above with regard to an example wherein filters having forms such as illustrated in FIGS. 3 and 4 are used. Next, description will be made regarding a case of using filters having forms such as illustrated in FIG. 14.

Figure 14:
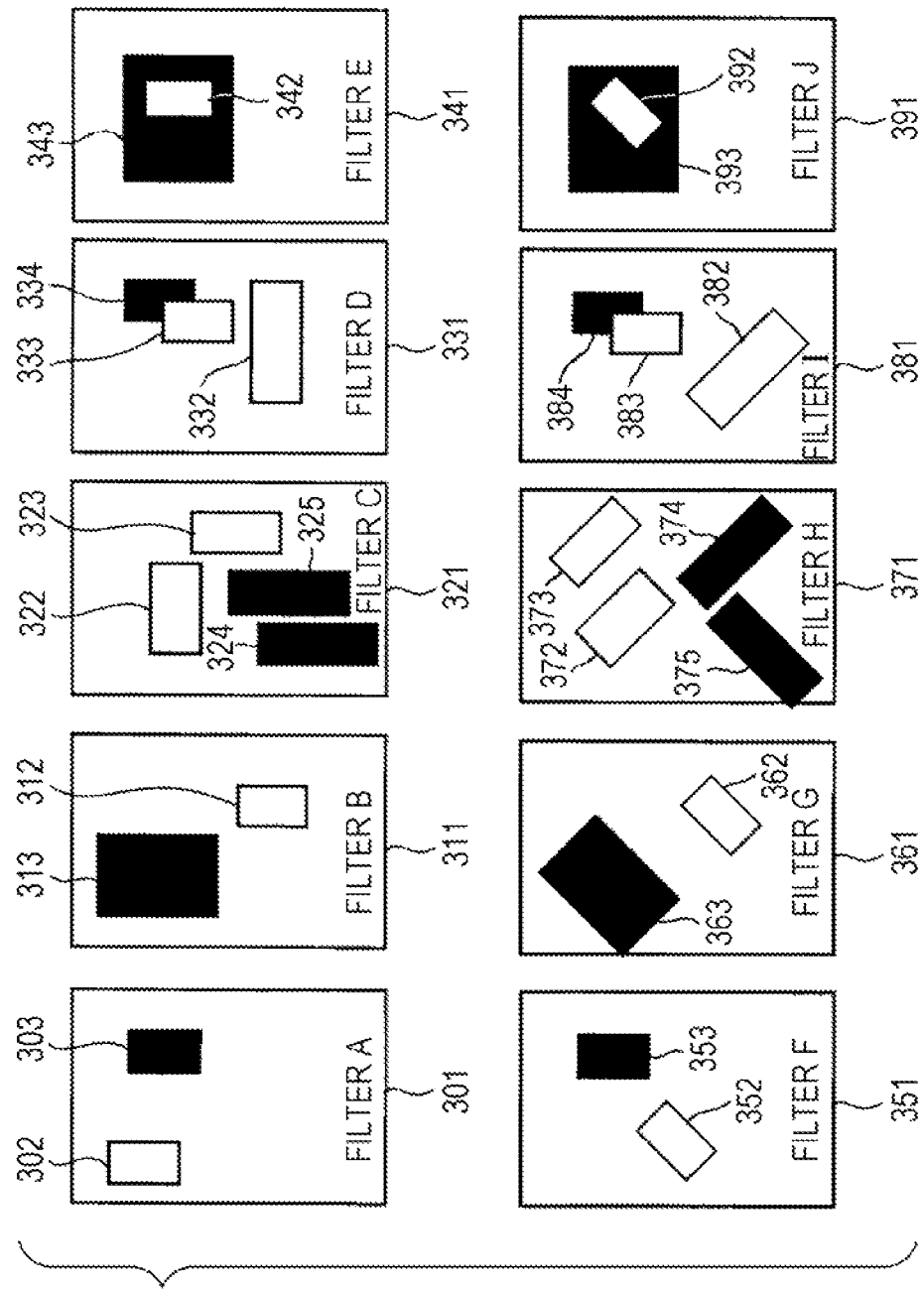
FIG. 14 is a diagram for describing another rectangular filter.

The filter A illustrated in FIG. 14 has a region 302 and a region 303 of the same size, which are disposed in an image 301 of a predetermined size (within a region 301 of a predetermined size within the image) with a predetermined interval therebetween. Note that, with the following description, the sizes of regions indicate an example, and are not restricted, and for example, the region 302 and region 303 may be regions of different sizes.

The regions 302 and 303 are both disposed facing in the vertical direction (i.e., the long sides of the rectangles are facing in the same direction, which is the vertical direction in the drawing). This layout is also an example, the interval between the regions, layout positions, layout directions thereof, and so forth do not represent restrictions.

The filter A is a filter for calculating the summation of the pixels values of pixels positioned within the region 302 (hereinafter, "summation 302'"), and the summation of the pixels values of pixels positioned within the region 303 (hereinafter, "summation 303'"), subtracting the summation 303' from the summation 302', and taking the difference value thereof as the feature amount. The absolute value of the difference value of the difference between the summation 302' and the summation 303' is taken as the feature amount, this feature amount does not depends on the sign of the difference value, and accordingly, it is desirable to configure this so as to calculate an absolute value.

In FIG. 14, description will be continued assuming that a region indicated in black (region 303 in the filter A) is subtracted from a region indicated in white (region 302 in the filter A). Also, description will be made assuming that the summation of the pixel values within the regions is calculated, but an average value may be employed instead of summation.

The filter B illustrated in FIG. 14 has a region 312 and a region 313 of different sizes, which are disposed in an image 311 of a predetermined size (within a region 311 of a predetermined size within the image) with a predetermined interval therebetween. Also, the region 312 and region 313 are both disposed facing in the vertical direction (i.e., the long sides of the rectangles are facing in the same direction, which is the vertical direction in the drawing).

The filter B is a filter for calculating the feature amount by calculating difference between the summation of the pixel values of pixels positioned within the region 312 and the summation of the pixel values of pixels positioned within the region 313.

The region 312 and the region 313 have of different sizes, so for example, pixel values are read out from the region 312 in succession, while pixel values are read out from the region 313 while thinning out, so the number of pixel values read out from these regions are made to be the same for calculating the difference value. Alternatively, since multiple resolution images are generated, a difference value may be calculated by performing processing using a plurality of the multiple resolution images.

For example, let us say that the region 313 is four times as large as the region 312. Also, we will take the region 312 as a reference, and an image to which the region 312 is applied as a reference image. At this time, the image to which the region 313 is applied is an image enlarged to four times the size of the reference image (multiple resolution image). Thus, using multiple resolution images in this way enables the number of pixel values and the like read out from the regions to be made the same, and accordingly a difference value is calculated.

The filter C illustrated in FIG. 14 has regions 322 through 325 of different sizes (or of the same size), which are disposed in an image 321 of a predetermined size (within a region 321 of a predetermined size within the image). Also, the region 322 is disposed in the horizontal direction (with the long sides of the rectangle facing in the horizontal direction in the drawing), while the regions 323 through 325 are both disposed facing in the vertical direction (i.e., the long sides of the rectangles are facing in the same direction, which is the vertical direction in the drawing).

In the event of applying the filter C, first, the summation of the pixels values of pixels positioned within the region 322 (hereinafter, "summation 322'"), and the summation of the pixels values of pixels positioned within the region 323 (hereinafter, "summation 323'") are calculated, and an added value (hereinafter, "added value 322''") is calculated by adding the summation 322' and the summation 323'. Also, similarly, the summation of the pixels values of pixels positioned within the region 324 (hereinafter, "summation 324'"), and the summation of the pixels values of pixels positioned within the region 325 (hereinafter, "summation 325'") are calculated, and an added value (hereinafter, "added value 324''") is calculated by adding the summation 324' and the summation 325'.

Upon the added value 322 and the added value 324 being calculated, the difference between these is calculated, and the absolute value of the difference value thereof is calculated. The filter C is a filter which takes the calculated absolute value as the feature amount. The regions 322 through 325 are of different sizes, and accordingly, as described in the filter B, the regions 322 through 325 are applied to multiple resolution images each of which the size is matched the size of each region, respectively, and the summation within the regions is calculated.

The filter D illustrated in FIG. 14 has regions 332 through 334 of different sizes (of the same size), which are disposed in an image 331 of a predetermined size (within a region 331 of a predetermined size within the image) with a predetermined interval therebetween. Also, the region 332 is disposed in the horizontal direction (with the long sides of the rectangle facing in the horizontal direction in the drawing), and the regions 333 and 334 are both disposed facing in the vertical direction (i.e., the long sides of the rectangles are facing in the same direction, which is the vertical direction in the drawing). Also, the region 333 and region 334 are disposed in a partially overlapping state.

In the event of applying the filter D, the summation of the pixel values of pixels positioned within the region 332 (hereinafter, "summation 332'"), and the summation of the pixels values of pixels positioned within the region 333 (hereinafter, "summation 333'") are calculated, and an added value (hereinafter, "added value 332''") is calculated by adding the summation 332' and the summation 333'. Also, similarly, the summation of the pixel values of pixels positioned within the region 334 (hereinafter, "summation 334'").

Upon the added value 332'' and the summation 334' being calculated, the difference between these is calculated, and the absolute value of the difference value thereof is calculated. The filter D is a filter which takes the calculated absolute value as the feature amount. The regions 332 through 334 are regions of different sizes, and accordingly, as described in the filter B, the regions 332 through 334 are applied to multiple resolution images each of which the size is matched the size of each region, respectively, and the summation within the regions is calculated.

The filter E illustrated in FIG. 14 has regions 342 and 343 of different sizes (or of the same size), which are disposed in an image 341 of a predetermined size (within a region 341 of a predetermined size within the image) with a predetermined interval therebetween. Also, the region 342 and region 343 are both disposed facing in the vertical direction (i.e., the long sides of the rectangles are facing in the same direction, which is the vertical direction in the drawing). Also, the region 342 and region 343 are disposed in a state wherein the region 342 is included in the region 343 (completely overlaid).

In the event of applying the filter E, first, the summation of the pixels values of pixels positioned within the region 342 (hereinafter, "summation 342'") is calculated, and the summation of the pixels values of pixels positioned within the region 343 (hereinafter, "summation 343'") is calculated. Upon the summation 342' and the summation 343' being calculated, the difference between these is calculated, and the absolute value of the difference value is calculated. The filter E is a filter which takes the calculated absolute value as the feature amount. The regions 342 and 343 are regions of different sizes, and accordingly, as described in the filter B, the regions 342 and 343 are applied to multiple resolution images each of which the size is matched the size of each region, respectively, and the summation within the regions is calculated.

The filter F illustrated in FIG. 14 has a region 352 and a region 353 of the same size, which are disposed in an image 351 of a predetermined size (within a region 351 of a predetermined size within the image) with a predetermined interval therebetween. Also, the region 352 is disposed in an inclined manner within the region 351, with the inclination thereof being such that the upper left corner thereof in the drawing is situated toward the top in the example illustrated in FIG. 14. Also, the region 353 is disposed facing in the vertical direction (i.e., the long sides of the rectangle are facing in the vertical direction in the drawing).

In the event of applying the filter F, first, the summation of the pixels values of pixels positioned within the region 352 (hereinafter, "summation 352'") is calculated, and the summation of the pixels values of pixels positioned within the region 353 (hereinafter, "summation 353'") is calculated. Upon the summation 352' and the summation 353' being calculated, the difference between these is calculated, and the absolute value of the difference value is calculated. The filter F is a filter which takes the calculated absolute value as the feature amount.

The filter G illustrated in FIG. 14 has a region 362 and a region 363 of different sizes, which are disposed in an image 361 of a predetermined size (within a region 361 of a predetermined size within the image) with a predetermined interval therebetween. Also, the region 362 and the region 363 are both disposed in an inclined manner within the region 361, with the inclination thereof being such that the upper left corner of the region 362 and the upper right corner of the region 363 in the drawing are situated toward the top in the example illustrated in FIG. 14.

In the event of applying the filter G, the summation of the pixels values of pixels positioned within the region 362 (hereinafter, "summation 362'") is calculated, and the summation of the pixels values of pixels positioned within the region 363 (hereinafter, "summation 363'") is calculated. Upon the summation 362' and the summation 363' being calculated, the difference between these is calculated, and the absolute value of the difference value is calculated. The filter G is a filter which takes the calculated absolute value as the feature amount. The region 362 and the region 363 are of different sizes, and accordingly, as described in the filter B, the regions 362 and 363 are applied to multiple resolution images each of which the size is matched the size of each region, respectively, and the summation within the regions is calculated.

The filter H illustrated in FIG. 14 has regions 372 through 375 of different sizes (or of the same size), which are disposed in an image 371 of a predetermined size (within a region 371 of a predetermined size within the image) with a predetermined interval therebetween. Also, the regions 372 through 374 are disposed in an inclined manner within the region 371, with the inclination thereof being such that the upper right corners of the regions 372 through 374 in the drawing are situated toward the top in the example illustrated in FIG. 14. Also, the region 375 is disposed in an inclined manner within the region 371, with the inclination thereof being such that the left upper corner of the region 375 in the drawing is situated toward the top in the example illustrated in FIG. 14.

In the event of applying the filter H, the summation of the pixels values of pixels positioned within the region 372 (hereinafter, "summation 372'"), and the summation of the pixels values of pixels positioned within the region 373 (hereinafter, "summation 373'") are calculated, and an added value (hereinafter, "added value 372''") is calculated by adding the summation 372' and the summation 373'. Also, similarly, the summation of the pixels values of pixels positioned within the region 374 (hereinafter, "summation 374'"), and the summation of the pixels values of pixels positioned within the region 375 (hereinafter, "summation 375'") are calculated, and an added value (hereinafter, "added value 374''") is calculated by adding the summation 374' and the summation 375'.

Upon the added value 372 and the added value 374 being calculated, the difference between these is calculated, and the absolute value of the difference value thereof is calculated. The filter H is a filter which takes the calculated absolute value as the feature amount. The regions 372 through 375 are of different sizes, and accordingly, as described in the filter B, the regions 372 through 375 are applied to multiple resolution images each of which the size is matched the size of each region, respectively, and the summation within the regions is calculated.

The filter I illustrated in FIG. 14 has regions 382 through 384 of different sizes (or of the same size), which are disposed in an image 381 of a predetermined size (within a region 381 of a predetermined size within the image) with a predetermined interval therebetween. Also, the region 382 is disposed in an inclined manner within the region 381, with the inclination thereof being such that the upper right corner thereof in the drawing is situated toward the top in the example illustrated in FIG. 14. The regions 383 and 384 are both disposed facing in the vertical direction (i.e., the long sides of the rectangles are facing in the same direction, which is the vertical direction in the drawing). Also, the regions 383 and region 384 are disposed in a partially overlapping state.

In the event of applying the filter I, the summation of the pixels values of pixels positioned within the region 382 (hereinafter, "summation 382'"), and the summation of the pixels values of pixels positioned within the region 383 (hereinafter, "summation 383'") are calculated, and an added value (hereinafter, "added value 382''") is calculated by adding the summation 382' and the summation 383'. Also, similarly, the summation of the pixels values of pixels positioned within the region 384 (hereinafter, "summation 384'") is calculated.

Upon the added value 382" and the summation 384' being calculated, the difference between these is calculated, and the absolute value of the difference value thereof is calculated. The filter I is a filter which takes the calculated absolute value as the feature amount. The regions 382 through 384 are of different sizes, and accordingly, as described in the filter B, the regions 382 through 384 are applied to multiple resolution images each of which the size is matched the size of each region, respectively, and the summation within the regions is calculated.

The filter J illustrated in FIG. 14 has a region 392 and a region 393 of different sizes (or of the same size), which are disposed in an image 391 of a predetermined size (within a region 391 of a predetermined size within the image) with a predetermined interval therebetween. Also, the region 392 is disposed in an inclined manner within the region 391, with the inclination thereof being such that the upper left corner thereof in the drawing is situated toward the top in the example illustrated in FIG. 14. Also, the region 393 is disposed facing in the vertical direction (i.e., the long sides of the rectangle are facing in the same direction, which is the vertical direction in the drawing). Also, the region 392 and region 393 are disposed in a state wherein the region 392 is included in the region 393 (completely overlaid).

In the event of applying the filter J, the summation of the pixels values of pixels positioned within the region 392 (hereinafter, "summation 392'") is calculated, and the summation of the pixels values of pixels positioned within the region 393 (hereinafter, "summation 393'") is calculated. Upon the summation 392' and the summation 393' being calculated, the difference between these is calculated, and the absolute value of the difference value is calculated. The filter J is a filter which takes the calculated absolute value as the feature amount. The regions 392 and 393 are of different sizes, and accordingly, as described in the filter B, the regions 392 and 393 are applied to multiple resolution images each of which the size is matched the size of each region, respectively, and the summation within the regions is calculated.

In this way, the filters illustrated in FIG. 14 are filters which include two or more regions, in which the summation (or average value) of pixel values within a region is calculated, and takes the absolute value of the difference value of the calculated summation thereof as the feature amount. Also, each of the regions has a rectangular shape, the layout position thereof does not have to be continued (adjacent), and may be disposed in a separate position. Further, a filter including regions having a different size may be configured by generating multiple resolution images and taking advantage of these.

Figure 15:
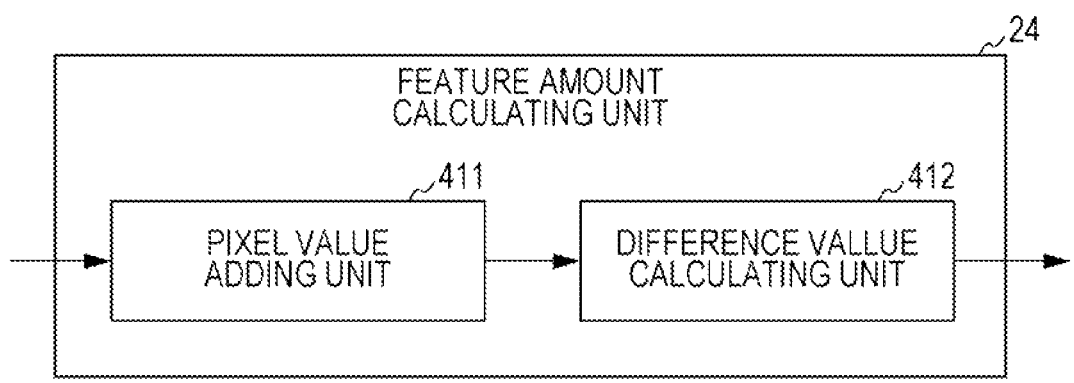
FIG. 15 is a diagram illustrating another configuration example of the feature amount calculating unit.

FIG. 15 is a diagram illustrating the configuration of the feature amount calculating unit 24 in the event of employing a filter such as illustrated in FIG. 14. The feature amount calculating unit 24 illustrated in FIG. 15 includes a pixel value adding unit 411 and a difference value calculating unit 412. The pixel value adding unit 411 adds the pixel value of the feature point supplied from the feature point extracting unit 23 (FIG. 1).

For example, in the event of the filter A (FIG. 14) being employed, the feature point extracting unit 23 extracts a pixel positioned within the region 302 as a feature point, and also supplies the pixel value of the feature point thereof to the pixel value adding unit 411 of the feature amount calculating unit 24. The pixel value adding unit 411 calculates the summation of the pixel values within the region 302 by adding the supplied pixel values. Similarly, the feature point extracting unit 23 extracts a pixel positioned within the region 303 as a feature point, and also supplies the pixel value of the feature point thereof to the pixel value adding unit 411 of the feature amount calculating unit 24. The pixel value adding unit 411 calculates the summation of the pixel values within the region 303 by adding the supplied pixel values.

Also, for example, when calculating a feature amount using a filter including two or more regions such as the filter C, the pixel value adding unit 411 also performs processing for adding the summation of the pixel values of each region as appropriate. For example, in the event of the filter C being applied, the pixel value adding unit 411 also performs processing for adding the summation of the region 322 and the summation of the region 323, and adding the summation of the region 324 and the summation of the region 325.

Note that in the event that the sizes of the regions 321 and 313 differ such as the filter B, in order to convert an image from which a feature point is extracted (image from which a pixel value is read out) into an image suitable for the size of a region, the feature extracting unit 23 also includes processing for selecting a multiple resolution image suitable for the size of the region from the multiple resolution images generated at the multiple-resolution image generating unit 22. Alternatively, the multiple-resolution image generating unit 22 is configured so as to generate a multiple resolution image suitable for the region of a filter to which the feature point extracting unit 23 is applied, and to supply this.

The summation calculated by the pixel value adding unit 411 of the feature amount calculating unit 24 is supplied to the difference value calculating unit 412. The difference value calculating unit 412 calculates the difference between the supplied summations, and supplies the absolute value of the difference value thereof to the identifier generating unit 25 as the feature amount.

The identifier generating unit 25 uses the feature amount thus calculated to generate an identifier. The identifier generating unit 25 can have the same configuration as the identifier generating unit 25 illustrated in FIG. 5, and the processing thereof has been described with reference to the flowchart in FIG. 8, and accordingly, description thereof will be omitted here.

Case of Using Histogram as Filter

Description has been made above with regard to an example wherein filters having forms such as shown in FIG. 3, 4, or 14 are used. Next, description will be made regarding a case of using filters having forms such as shown in FIG. 16.

Figure 16:
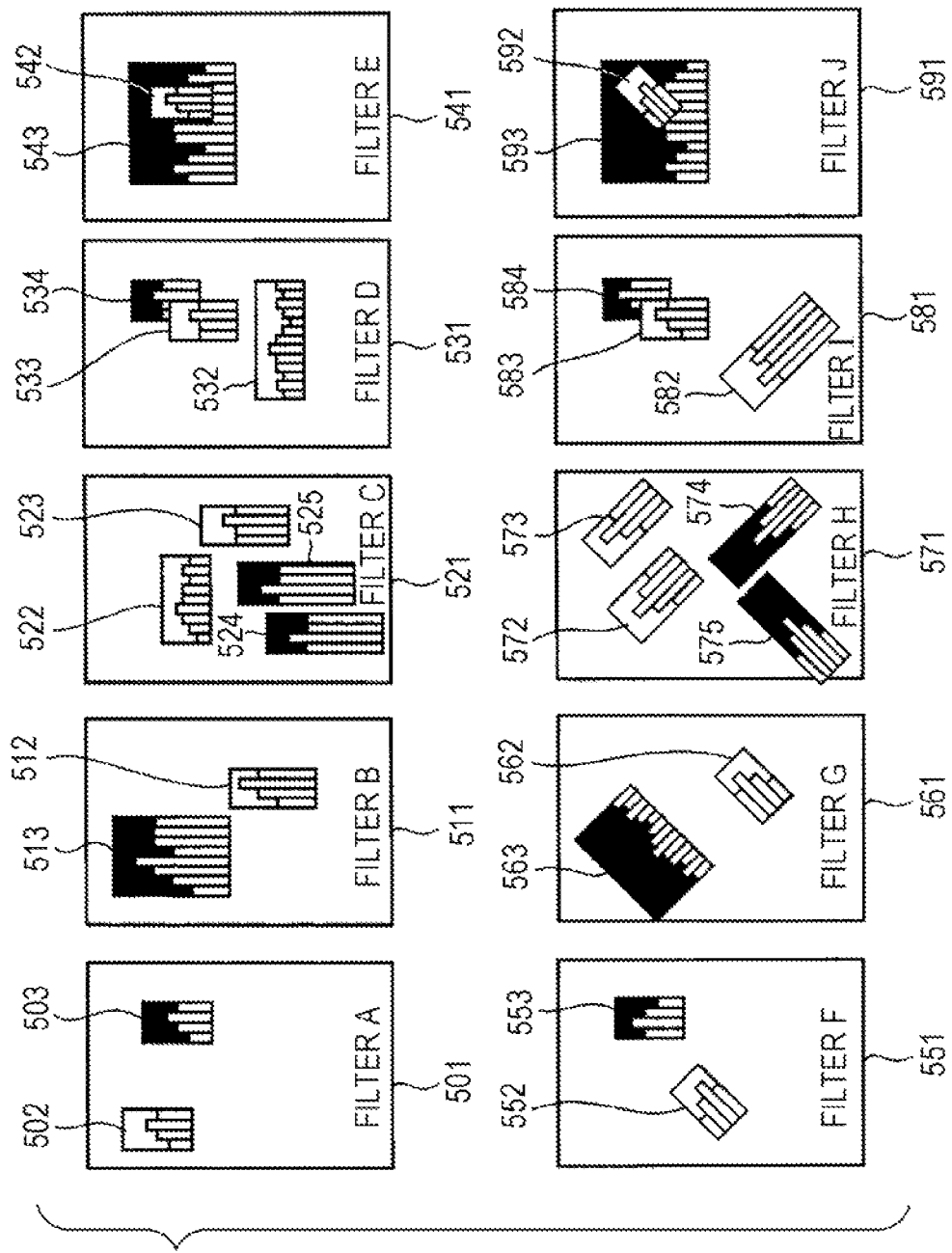
FIG. 16 is a diagram for describing another rectangular filter.

The filter A shown in FIG. 16 has a region 502 and a region 503 of the same size, which are disposed in an image 501 of a predetermined size (within a region 501 of a predetermined size within the image) with a predetermined interval therebetween. Also, the region 502 and region 503 both are disposed facing in the vertical direction (i.e., the long sides of the rectangles are facing in the same direction, which is the vertical direction in the drawing).

In the event of applying the filter A, a histogram is created from the pixel values of the pixels situated within the region 502, and the value thereof (hereinafter, "value 502'") is calculated. In the same way, a histogram is created from the pixel values of the pixels situated within the region 503, and the value thereof (hereinafter, "value 503'") is calculated. The difference value therebetween is calculated by subtracting value 503' from value 502'. The filter A is a filter wherein the feature amount is this difference value.

The absolute value of the difference value of the difference between the value 502' and value 503' is the feature amount, so the feature amount is not dependent on the sign of the difference value, and accordingly, a configuration wherein the absolute value is calculated is preferable. The following description will be made with the understanding that the absolute value is calculated.

Description will continue from FIG. 16 with the understanding that a value calculated from the region indicated by black (region 503 in the case of filter A) is subtracted from a value calculated from the region indicated by white (region 502 in the case of filter A). Also, description will be made under the assumption that a histogram value of the pixels within the region will be calculated, and the histogram used may be based on SIFT (Scale-Invariant Feature Transform) or HOG (Histograms of Oriented Gradients).

The filter B shown in FIG. 16 has a region 512 and a region 513 of different sizes, which are disposed in an image 511 of a predetermined size (within a region 511 of a predetermined size within the image) with a predetermined interval therebetween. Also, the region 512 and region 513 both are disposed facing in the vertical direction (i.e., the long sides of the rectangles are facing in the same direction, which is the vertical direction in the drawing).

In the event of applying the filter B, a histogram is created from the pixel values of the pixels situated within the region 512, and the value thereof (hereinafter, "value 512'") is calculated. In the same way, a histogram is created from the pixel values of the pixels situated within the region 513, and the value thereof (hereinafter, "value 513'") is calculated. The difference value between the value 512' and value 513' is calculated, and the absolute value thereof is further calculated. The filter B is a filter wherein the feature amount is calculated by taking the calculated absolute value as the feature amount.

The region 512 and the region 513 are of different sizes, so for example, pixel values are read out from the region 512 in succession, while pixel values are read out from the region 513 while thinning out, so the number of pixel values read out from these regions are made to be the same for calculating the difference value. Alternatively, since multiple resolution images are generated, a difference value may be calculated performing processing using a plurality of multiple resolution images. That is, let us say that the region 513 is four times as large as the region 512. Also, we will take the region 512 as a reference, and an image to which the region 512 is applied as a reference image. At this time, the image to which the region 513 is applied is an image enlarged to four times the size of the reference image (multiple resolution image). Using multiple resolution images in this way enables the number of pixel values and the like read out from the regions to be made the same, and accordingly a difference value is calculated.

The filter C shown in FIG. 16 has regions 522 through 525 of different sizes (or of the same size), which are disposed in an image 521 of a predetermined size (within a region 521 of a predetermined size within the image) with a predetermined interval therebetween. Also, the region 522 is disposed in the horizontal direction (with long sides of the rectangle facing in the horizontal direction of the drawing), while the regions 523 through 525 are disposed facing in the vertical direction (i.e., the long sides of the rectangles are facing in the same direction, which is the vertical direction in the drawing).

In the event of applying the filter C, a histogram is created from the pixel values of the pixels situated within the region 522, and the value thereof (hereinafter, "value 522'") is calculated. In the same way, a histogram is created from the pixel values of the pixels situated within the region 523, and the value thereof (hereinafter, "value 523'") is calculated. An added value obtained by adding the value 522' and value 523' (hereinafter, "added value 522''") is calculated.

In the same way, a histogram is created from the pixel values of the pixels situated within the region 524, and the value thereof (hereinafter, "value 524'") is calculated. Also, a histogram is created from the pixel values of the pixels situated within the region 525, and the value thereof (hereinafter, "value 525'") is calculated. An added value obtained by adding the value 524' and value 525' (hereinafter, "added value 524''") is calculated.

Upon the added value 522'' and added value 524'' being calculated, the difference thereof is calculated, and the absolute value of the difference value is calculated. The filter C is a filter wherein the feature amount is calculated by taking the calculated absolute value as the feature amount. The regions 522 through 525 are of different sizes, so the regions 522 through 525 are applied to multiple resolution images matching the size of each region, histograms within the regions are created, and the values thereof are calculated, as described with the case of the filter B.

The filter D shown in FIG. 16 has regions 532 through 534 of different sizes (or of the same size), which are disposed in an image 531 of a predetermined size (within a region 531 of a predetermined size within the image) with a predetermined interval therebetween. Also, the region 532 is disposed in the horizontal direction (with long sides of the rectangle facing in the horizontal direction of the drawing), while the regions 533 and 534 are disposed facing in the vertical direction (i.e., the long sides of the rectangles are facing in the same direction, which is the vertical direction in the drawing). Also, the region 533 and region 534 are disposed in a partially overlapping state.

In the event of applying the filter D, a histogram is created from the pixel values of the pixels situated within the region 532, and the value thereof (hereinafter, "value 532'") is calculated. In the same way, a histogram is created from the pixel values of the pixels situated within the region 533, and the value thereof (hereinafter, "value 533'") is calculated. An added value obtained by adding the value 532' and value 533' (hereinafter, "added value 532''") is calculated. Also, in the same way, a histogram is created from the pixel values of the pixels situated within the region 534, and the value thereof (hereinafter, "value 534'") is calculated.

Upon the added value 532'' and value 534' being calculated, the difference thereof is calculated, and the absolute value of the difference value is calculated. The filter D is a filter wherein the feature amount is calculated by taking the calculated absolute value as the feature amount. The regions 532 through 534 are of different sizes, so the regions 532 through 534 are applied to multiple resolution images matching the size of each region, and the values of histograms within the regions are calculated, as described with the case of the filter B.

The filter E shown in FIG. 16 has regions 542 and 543 of different sizes (or of the same size), which are disposed in an image 541 of a predetermined size (within a region 541 of a predetermined size within the image) with a predetermined interval therebetween. Also, the region 542 and region 543 are disposed facing in the vertical direction (i.e., the long sides of the rectangles are facing in the same direction, which is the vertical direction in the drawing). Also, the region 542 and region 534 are disposed in a state wherein the region 542 is included in the region 543 (completely overlaid).

In the event of applying the filter E, a histogram is created from the pixel values of the pixels situated within the region 542, and the value thereof (hereinafter, "value 542'") is calculated. In the same way, a histogram is created from the pixel values of the pixels situated within the region 543, and the value thereof (hereinafter, "value 543'") is calculated. Upon the value 542' and value 543' being calculated, the difference thereof is calculated, and the absolute value of the difference value is calculated. The filter E is a filter wherein the feature amount is calculated by taking the calculated absolute value as the feature amount. The region 542 and region 534 are of different sizes, so the region 542 and region 534 are applied to multiple resolution images matching the size of each region, and the values of histograms within the regions are calculated, as described with the case of the filter B.

The filter F shown in FIG. 16 has a region 552 and a region 553 of the same size, which are disposed in an image 551 of a predetermined size (within a region 551 of a predetermined size within the image) with a predetermined interval therebetween. Also, the region 552 is disposed in an inclined manner within the region, with the inclination thereof being such that the upper left corner thereof in the drawing is situated toward the top in the example shown in FIG. 16. Further, the region 553 is disposed facing in the vertical direction (i.e., the long sides of the rectangle are facing in the vertical direction in the drawing).

In the event of applying the filter F, a histogram is created from the pixel values of the pixels situated within the region 552, and the value thereof (hereinafter, "value 552'") is calculated, a histogram is created from the pixel values of the pixels situated within the region 553, and the value thereof (hereinafter, "value 553'") is calculated. Upon the value 552' and value 553' being calculated, the difference value therebetween is calculated, and the absolute value of the difference value is calculated. The filter F is a filter wherein the calculated absolute value is taken as the feature amount.

The filter G shown in FIG. 16 has a region 562 and a region 563 of different sizes, which are disposed in an image 561 of a predetermined size (within a region 561 of a predetermined size within the image) with a predetermined interval therebetween. Also, the regions 562 and the region 563 are disposed in an inclined manner within the region 561, with the inclination thereof being such that the upper left corner of the region 562 and the upper right corner of the region 563 in the drawing are toward the top in the example shown in FIG. 16.

In the event of applying the filter G, a histogram is created from the pixel values of the pixels situated within the region 562, and the value thereof (hereinafter, "value 562'") is calculated. In the same way, a histogram is created from the pixel values of the pixels situated within the region 513, and the value thereof (hereinafter, "value 563'") is calculated. The difference value between the value 562' and value 563' is calculated, and the absolute value thereof is further calculated. The filter G is a filter wherein the feature amount is calculated by taking the calculated absolute value as the feature amount. The region 562 and the region 563 are of different sizes, so the regions 562 and 563 are applied to multiple resolution images matching the size of each region, histograms within the regions are created, and the values thereof are calculated, as described with the case of the filter B.

The filter H shown in FIG. 16 has regions 572 through 275 of different sizes (or of the same size), which are disposed in an image 571 of a predetermined size (within a region 571 of a predetermined size within the image) with a predetermined interval therebetween. Also, the regions 572 through 574 are disposed in an inclined manner within the region 571, with the inclination thereof being such that the upper right corners of the regions 572 through 575 in the drawing and the upper left corner of the region 575 are toward the top in the example shown in FIG. 16.

In the event of applying the filter H, a histogram is created from the pixel values of the pixels situated within the region 572, and the value thereof (hereinafter, "value 572'") is cal-culated. In the same way, a histogram is created from the pixel values of the pixels situated within the region 573, and the value thereof (hereinafter, "value 573'") is calculated. An added value obtained by adding the value 572' and value 573' (hereinafter, "added value 572''") is calculated.

In the same way, a histogram is created from the pixel values of the pixels situated within the region 574, and the value thereof (hereinafter, "value 574'") is calculated. Also, a histogram is created from the pixel values of the pixels situated within the region 575, and the value thereof (hereinafter, "value 575'") is calculated. An added value obtained by adding the value 574' and value 575' (hereinafter, "added value 574''") is calculated.

Upon the added value 572'' and added value 574'' being calculated, the difference thereof is calculated, and the absolute value of the difference value is calculated. The filter H is a filter wherein the feature amount is calculated by taking the calculated absolute value as the feature amount. The regions 572 through 575 are of different sizes, so the regions 572 through 575 are applied to multiple resolution images matching the size of each region, histograms within the regions are created, and the values thereof are calculated, as described with the case of the filter B.

The filter I shown in FIG. 16 has regions 582 through 584 of different sizes (or of the same size), which are disposed in an image 586 of a predetermined size (within a region 586 of a predetermined size within the image) with a predetermined interval therebetween. Also, the region 582 is disposed in an inclined manner within the region, with the inclination thereof being such that the upper right corner thereof in the drawing is situated toward the top in the example shown in FIG. 16, while the regions 583 and 584 are disposed facing in the vertical direction (i.e., the long sides of the rectangles are facing in the same direction, which is the vertical direction in the drawing). Also, the region 583 and region 584 are disposed in a partially overlapping state.

In the event of applying the filter I, a histogram is created from the pixel values of the pixels situated within the region 582, and the value thereof (hereinafter, "value 582'") is calculated. In the same way, a histogram is created from the pixel values of the pixels situated within the region 583, and the value thereof (hereinafter, "value 583'") is calculated. An added value obtained by adding the value 582' and value 583' (hereinafter, "added value 582''") is calculated. Also, in the same way, a histogram is created from the pixel values of the pixels situated within the region 584, and the value thereof (hereinafter, "value 584'") is calculated.

Upon the added value 582' and value 584' being calculated, the difference thereof is calculated, and the absolute value of the difference value is calculated. The filter I is a filter wherein the feature amount is calculated by taking the calculated absolute value as the feature amount. The regions 582 through 584 are of different sizes, so the regions 582 through 584 are applied to multiple resolution images matching the size of each region, and the values of histograms within the regions are calculated, as described with the case of the filter B.

The filter J shown in FIG. 16 has regions 592 and 593 of different sizes (or of the same size), which are disposed in an image 591 of a predetermined size (within a region 591 of a predetermined size within the image) with a predetermined interval therebetween. Also, the region 592 is disposed in an inclined manner within the region, with the inclination thereof being such that the upper left corner thereof in the drawing is situated toward the top in the example shown in FIG. 16. The region 593 is disposed facing in the vertical direction (i.e., the long sides of the rectangle are facing in the vertical direction in the drawing). Also, the region 592 and region 534 are disposed in a state wherein the region 592 is included in the region 593 (completely overlaid).

In the event of applying the filter J, a histogram is created from the pixel values of the pixels situated within the region 592, the value thereof (hereinafter, "value 592'") is calculated, a histogram is created from the pixel values of the pixels situated within the region 593, and the value thereof (hereinafter, "value 593'") is calculated. Upon the value 592' and value 593' being calculated, the difference thereof is calculated, and the absolute value of the difference value is calculated. The filter J is a filter wherein the feature amount is calculated by taking the calculated absolute value as the feature amount. The region 592 and region 593 are of different sizes, so the region 592 and region 593 are applied to multiple resolution images matching the size of each region, and the values of histograms within the regions are calculated, as described with the case of the filter B.

As described above, the filters shown in FIG. 16 are filters having two or more regions, wherein histograms of pixels values within the regions are created, the values thereof are calculated, and the absolute value of the difference values of the calculated values is taken as a feature amount. Also, each of the regions do not have to be formed as rectangles with the placement position thereof being continuous (adjacent), and may be placed at remote positions. Further, a filter having regions with differing sizes can be configured by generating and using multiple resolution images.

Note that while the above embodiment describes having two or more regions and histograms of pixel values within the regions being created, an arrangement may be made wherein the values of histograms are calculated such that the sum of histograms is normalized to 1. An arrangement may be made wherein the histogram values following normalization are used to performed computation such as described above, i.e., the difference between regions being calculated and the absolute value thereof being calculated.

By normalizing so that the sum of histograms is 1, even cases of applying a filter having, for example, a region 512 and region 513 of different sizes as with the filter B, can allow for comparison on the same scale. Comparing on the same scale means to process using multiple resolution images of the same resolution, for example. Performing processing using multiple resolution images of the same resolution allows the number of processing procedures as compared to a case of processing using multiple resolution images of multiple resolutions, and processing speed to be improved.

Figure 17:
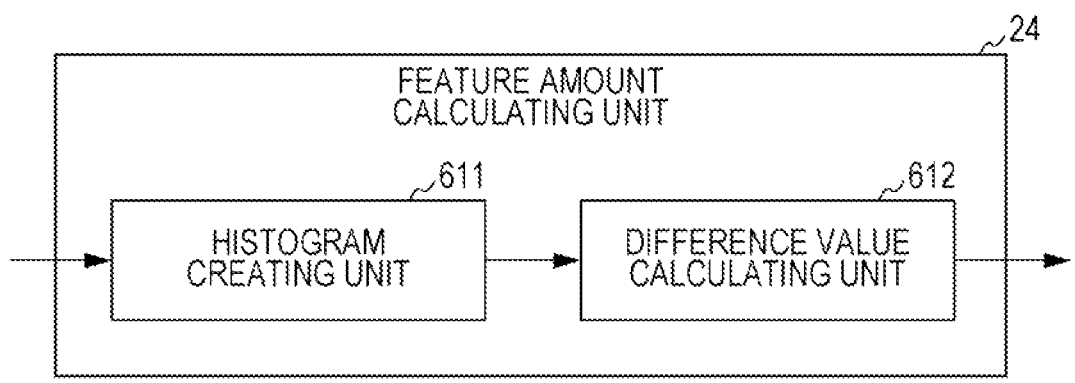
FIG. 17 is a diagram illustrating another configuration example of the feature amount calculating unit.

FIG. 17 is a diagram illustrating the configuration of the feature amount calculating unit 24 in the case of using filters such as shown in FIG. 16. The feature amount calculating unit 24 shown in FIG. 17 has a histogram creating unit 611 and a difference value calculating unit 612. The histogram creating unit 611 creates histograms from the pixel values of feature points supplied from the feature point extracting unit 23 (FIG. 1), and calculates the values thereof.

For example, in the case of applying the filter A (FIG. 16), the feature point extracting unit 23 extracts pixels situated within the region 502 as feature points, and supplies the pixel values of the feature points to the histogram creating unit 611 of the feature amount calculating unit 24. The histogram creating unit 611 creates a histogram for the supplied pixel values, an calculates the value thereof. In the same way, the feature point extracting unit 23 extracts pixels situated within the region 503 as feature points, and supplies the pixel values of the feature points to the histogram creating unit 611 of the feature amount calculating unit 24.

Also, in the event of calculating feature amounts with a filter having more than two regions, as with the filter C for example, the histogram creating unit 611 performs processing of adding the values of the histograms of the pixel values for each of the regions, as appropriate. For example, in the event that the filter C is applied, the histogram creating unit 611 also performs the processing of adding the value of the histogram of the region 522 and the value of the histogram of the region 523, and adding the value of the histogram of the region 524 and the value of the histogram of the region 525.

Note that in the event that the size of the region 512 and region 513 differ as in the case of the filter B, the feature point extracting unit 23 also performs processing for selecting multiple resolution images suitable for the size of the region from the multiple resolution images generated at the multiple resolution image generating unit 22, so that the image from which feature points are to be extracted (the image from which pixel values are to be read out) is an image of a size suitable for the region. Also, the multiple resolution image generating unit 22 generates multiple resolution images suitable for the regions of the filter which the feature point extracting unit 23 applies, so as to be supplied thereto.

Also, in the event that the histogram creating unit 611 is configured so as to perform normalization such that the sum of histograms is 1, even cases of applying a filter including regions of different sizes can be handled by performing processing using multiple resolution images of the same resolution. In this case, the feature point extracting unit 23 selects one multiple resolution image from the multiple resolution images supplied from the multiple resolution image generating unit 22, and extracts feature points from the selected multiple resolution image, which are supplied to the histogram creating unit 611. Also, in this case, the histogram creating unit 611 may be arranged to use a plurality of multiple resolution images so as to apply the same filter to each of the multiple resolution images and calculate the feature points.

The values of the histograms calculated by the histogram creating unit 611 of the feature amount calculating unit 24 are supplied to the difference value calculating unit 612. The difference value calculating unit 612 calculates the difference among the supplied histogram values, and supplies the absolute value of the difference value thereof to the identifier generating unit 25.

The identifier generating unit 25 generates identifiers using feature amounts calculated in this way. The identifier generating unit 25 may be of the same configuration as the identifier generating unit 25 shown in FIG. 5, and the processing thereof has been described with reference to the flowchart in FIG. 8, so description thereof will be omitted.

Case of Using Region Difference Value as Filter

Description has been made above with regard to an example wherein filters having forms such as shown in FIG. 3, 4, 14, or 16 are used. Next, description will be made regarding a case of using filters having forms such as shown in FIG. 18.

Figure 18:
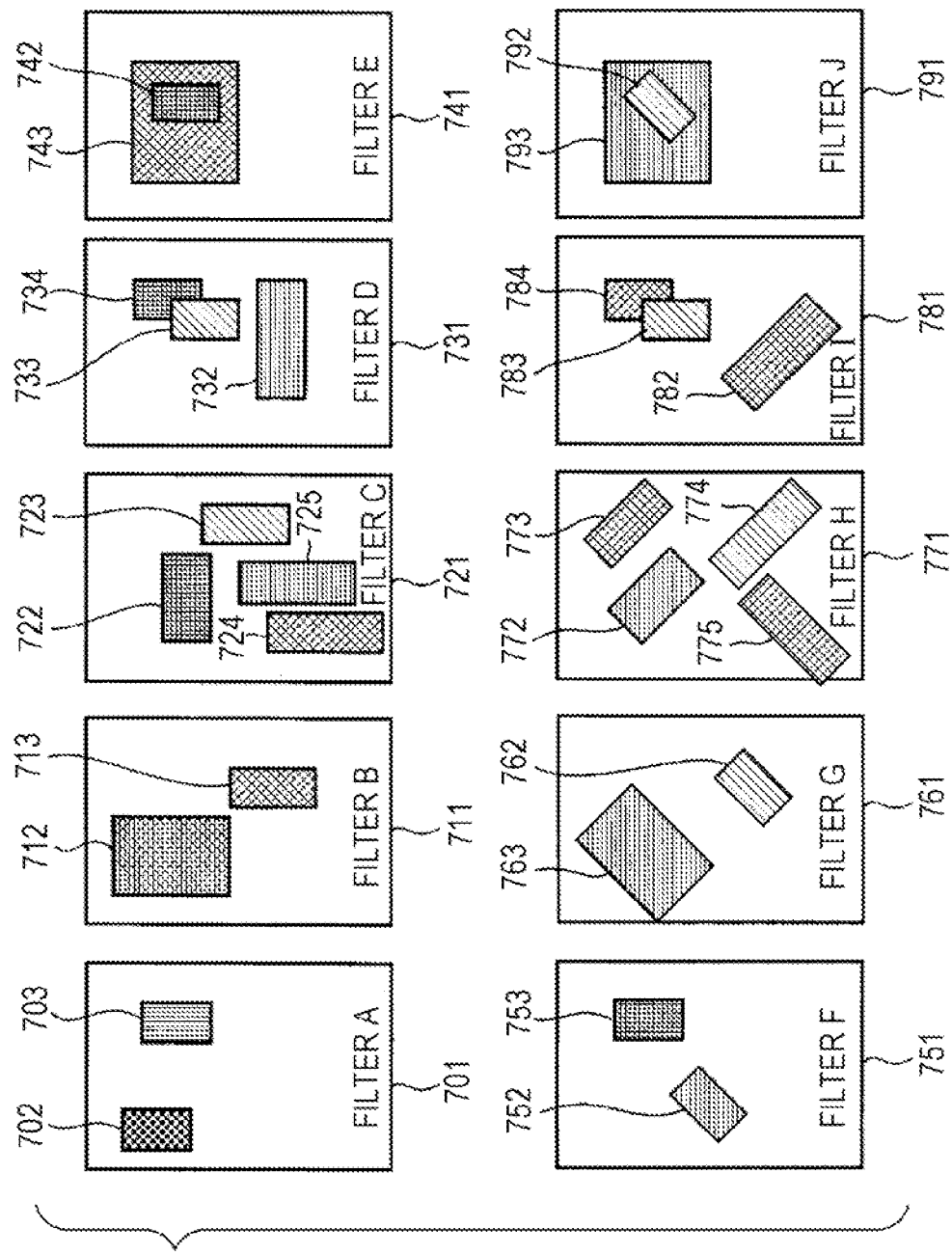
FIG. 18 is a diagram for describing another rectangular filter.

The filter A shown in FIG. 18 has a region 702 and a region 703 of the same size, which are disposed in an image 701 of a predetermined size (within a region 701 of a predetermined size within the image) with a predetermined interval therebetween. Also, the region 702 and region 703 both are disposed facing in the vertical direction (i.e., the long sides of the rectangles are facing in the same direction, which is the vertical direction in the drawing).

The filter A is a filter wherein the value of difference between the pixel values of the pixels situated within the region 702 and the pixel values of the pixels situated within the region 703 is calculated, and the difference value is taken as a feature amount. In the event that the region 702 and region 703 are regions of the same size, pixels situated at corresponding positions within the regions are compared, and the difference value thereof is calculated.

The absolute value of the difference value is the feature amount, so the feature amount is not dependent on the sign of the difference value, and accordingly, a configuration wherein the absolute value is calculated is preferable. The following description will be made with the understanding that the absolute value is calculated. Also, a luminance value may be used as the pixel value.

The filter B shown in FIG. 18 has a region 712 and a region 713 of different sizes, which are disposed in an image 711 of a predetermined size (within a region 711 of a predetermined size within the image) with a predetermined interval therebetween. Also, the region 712 and region 713 both are disposed facing in the vertical direction (i.e., the long sides of the rectangles are facing in the same direction, which is the vertical direction in the drawing).

The filter B is a filter wherein the feature amount is calculated by calculating the difference between the pixel values of the pixels situated within the region 712 and the pixel values of the pixels situated within the region 713.

The region 712 and the region 713 are of different sizes, so for example, pixel values are read out from the region 712 in succession, while pixel values are read out from the region 713 while thinning out, so the number of pixel values read out from these regions are made to be the same for calculating the difference value. Alternatively, since multiple resolution images are generated, a difference value may be calculated performing processing using a plurality of multiple resolution images. That is, let us say that the region 713 is four times as large as the region 712. Also, we will take the region 712 as a reference, and an image to which the region 712 is applied as a reference image. At this time, the image to which the region 713 is applied is an image enlarged to four times the size of the reference image (multiple resolution image). Using multiple resolution images in this way enables the number of pixel values and the like read out from the regions to be made the same, and accordingly a difference value is calculated.

The filter C shown in FIG. 18 has regions 722 through 725 of different sizes (or of the same size), which are disposed in an image 721 of a predetermined size (within a region 721 of a predetermined size within the image) with a predetermined interval therebetween. Also, the region 722 is disposed in the horizontal direction (with long sides of the rectangle facing in the horizontal direction of the drawing), while the regions 723 through 725 are disposed facing in the vertical direction (i.e., the long sides of the rectangles are facing in the same direction, which is the vertical direction in the drawing).

In the event of applying the filter C, difference values between the pixel values of the pixels situated within the region 722, the pixel values of the pixels situated within the region 723, the pixel values of the pixels situated within the region 724, and the pixel values of the pixels situated within the region 725, are calculated. In the event that more than two regions are included in the filter in this way, pixels values situated in other regions are subtracted in order from the pixel values situated in a reference region, thereby calculating difference values. Alternatively, an arrangement may be made wherein difference values are calculated from the pixel values of two regions, and further difference values of the difference values are calculated.

The filters shown in FIG. 18 are filters for calculating feature amounts by calculating the difference values between pixel values situated in predetermined regions, and the way in which the difference values are obtained, which region is used to calculate difference values from which region, and so forth, can be changed as suitable. Further, how to obtain difference values may itself be used as a feature of the filter.

For example, a case of subtracting in the order of region 323, region 324, and region 325, from region 322 and a case of subtracting in the order of region 325, region 324, and region 323, from region 322, can yield different feature amounts being obtained, and there is a possibility that objects and outlines which can be detected will differ according to the difference in features. Accordingly, the same filter can perform learning with different ways of calculating difference values. Other filters can apply various ways of calculation, in the same way. The following description will be made with the understanding that difference values are calculated by a predetermined region being taken as a reference, and subtraction being sequentially performed from that region.

The filter D shown in FIG. 18 has regions 732 through 734 of different sizes (or of the same size), which are disposed in an image 731 of a predetermined size (within a region 731 of a predetermined size within the image) with a predetermined interval therebetween. Also, the region 732 is disposed in the horizontal direction (with long sides of the rectangle facing in the horizontal direction of the drawing), while the regions 733 and 734 are disposed facing in the vertical direction (i.e., the long sides of the rectangles are facing in the same direction, which is the vertical direction in the drawing). Also, the region 733 and region 734 are disposed in a partially overlapping state.

In the event of applying the filter D, the difference values of the pixel values of the pixels situated within the region 732, the pixel values of the pixels situated within the region 733, the pixel values of the pixels situated within the region 734, are calculated, and the absolute value of the difference values is calculated. The filter D is a filter wherein the feature amount is calculated by taking the calculated absolute value as the feature amount. The regions 732 through 734 are of different sizes, so the regions 732 through 724 are applied to multiple resolution images matching the size of each region, and the difference values between the pixels within the regions are calculated, as described with the case of the filter B.

The filter E shown in FIG. 18 has regions 742 and 743 of different sizes (or of the same size), which are disposed in an image 741 of a predetermined size (within a region 741 of a predetermined size within the image) with a predetermined interval therebetween. Also, the region 742 and region 743 are disposed facing in the vertical direction (i.e., the long sides of the rectangles are facing in the same direction, which is the vertical direction in the drawing). Also, the region 742 and region 734 are disposed in a state wherein the region 742 is included in the region 743 (completely overlaid).

The filter E is a filter wherein the feature amount is calculated by calculating the difference between the pixel values of the pixels situated within the region 742 and the pixel values of the pixels situated within the region 743, and taking the calculated absolute value as the feature amount. The region 742 and region 734 are of different sizes, so the region 742 and region 734 are applied to multiple resolution images matching the size of each region, and the difference values between the pixels within the regions are calculated, as described with the case of the filter B.

The filter F shown in FIG. 18 has a region 752 and a region 753 of the same size, which are disposed in an image 751 of a predetermined size (within a region 751 of a predetermined size within the image) with a predetermined interval therebetween. Also, the region 752 is disposed in an inclined manner within the region, with the inclination thereof being such that the upper left corner thereof in the drawing is situated toward the top in the example shown in FIG. 18. Further, the region 753 is disposed facing in the vertical direction (i.e., the long sides of the rectangle are facing in the vertical direction in the drawing).

The filter F is a filter wherein the feature amount is calculated by calculating the difference between the pixel values of the pixels situated within the region 752 and the pixel values of the pixels situated within the region 753, and taking the calculated absolute value as the feature amount. With the filter F, the region 752 is disposed in an inclined manner, but the pixels at a position within the region are compared with pixels at a corresponding region assuming that the region 752 and region 753 are arrayed in the same direction, whereby difference values are calculated.

The filter G shown in FIG. 18 has a region 762 and a region 763 of different sizes, which are disposed in an image 761 of a predetermined size (within a region 761 of a predetermined size within the image) with a predetermined interval therebetween. Also, the regions 762 and the region 763 are disposed in an inclined manner within the region 761, with the inclination thereof being such that the upper left corner of the region 762 and the upper right corner of the region 763 in the drawing are toward the top in the example shown in FIG. 18.

The filter G is a filter wherein the feature amount is calculated by calculating the difference between the pixel values of the pixels situated within the region 762 and the pixel values of the pixels situated within the region 763, and taking the calculated absolute value as the feature amount. The region 762 and the region 763 are of different sizes, so the regions 762 and 763 are applied to multiple resolution images matching the size of each region, and the difference values between the pixels within the regions are calculated, as described with the case of the filter B.

The filter H shown in FIG. 18 has regions 772 through 275 of different sizes (or of the same size), which are disposed in an image 771 of a predetermined size (within a region 771 of a predetermined size within the image) with a predetermined interval therebetween. Also, the regions 772 through 275 are disposed in an inclined manner within the region 775, with the inclination thereof being such that the upper right corners of the regions 772 through 775 in the drawing and the upper left corner of the region 775 are toward the top in the example shown in FIG. 18.

The filter H is a filter wherein the feature amount is calculated by calculating the difference between the pixel values of the pixels situated within the region 772, the pixel values of the pixels situated within the region 773, the pixel values of the pixels situated within the region 774, and the pixel values of the pixels situated within the region 775, and taking the calculated absolute value as the feature amount. The regions 772 through 775 are of different sizes, so the regions 772 through 775 are applied to multiple resolution images matching the size of each region, and the difference values between the pixels within the regions are calculated, as described with the case of the filter B.

The filter I shown in FIG. 18 has regions 782 through 784 of different sizes (or of the same size), which are disposed in an image 781 of a predetermined size (within a region 781 of a predetermined size within the image) with a predetermined interval therebetween. Also, the region 782 is disposed in an inclined manner within the region, with the inclination thereof being such that the upper right corner thereof in the drawing is situated toward the top in the example shown in FIG. 18, while the regions 783 and 784 are disposed facing in the vertical direction (i.e., the long sides of the rectangles are facing in the same direction, which is the vertical direction in the drawing). Also, the region 783 and region 784 are disposed in a partially overlapping state.

The filter I is a filter wherein the feature amount is calculated by calculating the difference between the pixel values of the pixels situated within the region 782, the pixel values of the pixels situated within the region 783, and the pixel values of the pixels situated within the region 784, and taking the calculated absolute value as the feature amount. The regions 782 through 784 are of different sizes, so the regions 782 through 724 are applied to multiple resolution images matching the size of each region, and the difference values between the pixels within the regions are calculated, as described with the case of the filter B.

The filter J shown in FIG. 18 has regions 792 and 793 of different sizes (or of the same size), which are disposed in an image 791 of a predetermined size (within a region 791 of a predetermined size within the image) with a predetermined interval therebetween. Also, the region 792 is disposed in an inclined manner within the region, with the inclination thereof being such that the upper left corner thereof in the drawing is situated toward the top in the example shown in FIG. 18. The region 793 is disposed facing in the vertical direction (i.e., the long sides of the rectangle are facing in the vertical direction in the drawing). Also, the region 792 and region 734 are disposed in a state wherein the region 792 is included in the region 793 (completely overlaid).

The filter J is a filter wherein the feature amount is calculated by calculating the difference between the pixel values of the pixels situated within the region 792, the pixel values of the pixels situated within the region 793, and the pixel values of the pixels situated within the region 783, and taking the calculated absolute value as the feature amount. The region 792 and region 793 are of different sizes, so the region 792 and region 793 are applied to multiple resolution images matching the size of each region, and the difference values between the pixels within the regions are calculated, as described with the case of the filter B.

As described above, the filters shown in FIG. 18 are filters having two or more regions, wherein difference values between pixels values within the regions are calculated, and the absolute value of the calculated difference values is taken as a feature amount. Also, each of the regions do not have to be formed as rectangles with the placement position thereof being continuous (adjacent), and may be placed at remote positions. Further, a filter having regions with differing sizes can be configured by generating and using multiple resolution images.

Figure 19:
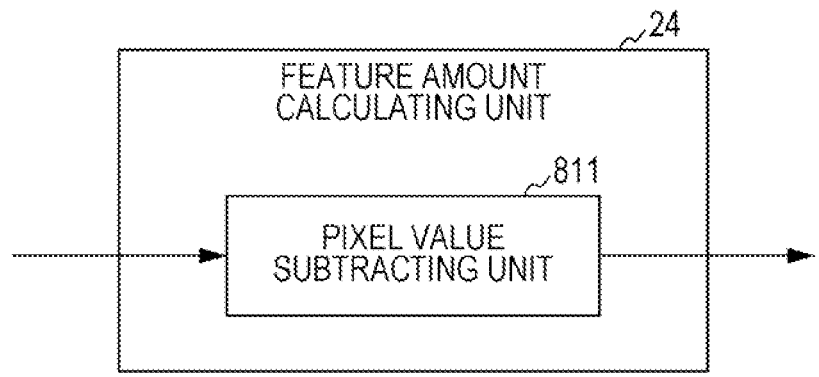
FIG. 19 is a diagram illustrating another configuration example of the feature amount calculating unit.
Figure 20:
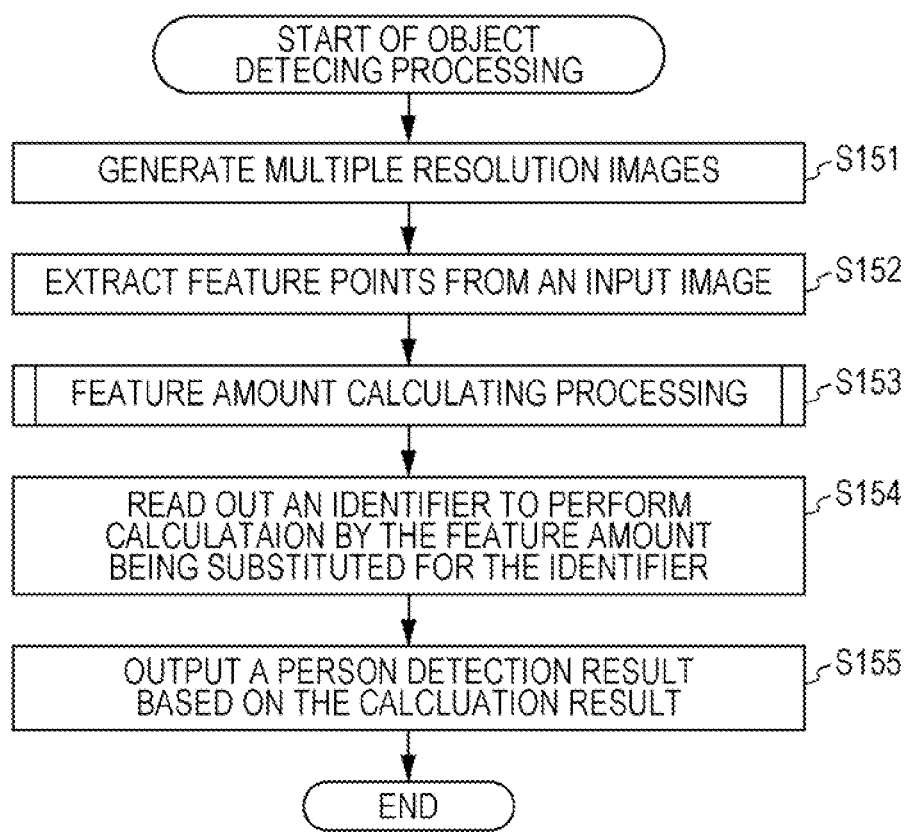
FIG. 20 is a flowchart for describing object detecting processing.

FIG. 19 is a diagram illustrating the configuration of the feature amount calculating unit 24 in the case of using filters such as shown in FIG. 18. The feature amount calculating unit 24 shown in FIG. 19 has a pixel value subtracting unit 811. The pixel value subtracting unit 811 adds the pixel values of feature points supplied from the feature point extracting unit 23 (FIG. 1).

For example, in the case of using the filter A (FIG. 18), the feature point extracting unit 23 extracts pixels situated within the region 702 as feature points, and supplies the pixel values of the feature points to the pixel value subtracting unit 811 of the feature amount calculating unit 24. In the same way, the feature point extracting unit 23 extracts pixels situated within the region 703 as feature points, and supplies the pixel values of the feature points to the pixel value subtracting unit 811 of the feature amount calculating unit 24. The pixel value subtracting unit 811 subtracts one of the supplied pixel values from the other. The pixel value subtracting unit 811 further calculates the absolute value of the subtraction results (difference value), and outputs this to the identifier generating unit 25 as a feature amount.

Also, in the event of calculating feature amounts with a filter having more than two regions, as with the filter C for example, the pixel value subtracting unit 811 performs processing of further subtracting, from the difference value of pixel values of the region, pixel values of other regions. For example, in the event that the filter C is applied, the pixel value subtracting unit 811 also performs the processing of calculating the difference value between the pixels of the region 722 and region 723, from which the pixel values of the region 724 and region 745 are then subtracted in order.

Note that in the event that the size of the region 721 and region 713 differ as in the case of the filter B, the feature point extracting unit 23 also performs processing for selecting multiple resolution images suitable for the size of the region from the multiple resolution images generated at the multiple resolution image generating unit 22, so that the image from which feature points are to be extracted (the image from which pixel values are to be read out) is an image of a size suitable for the region. Also, the multiple resolution image generating unit 22 generates multiple resolution images suitable for the regions of the filter which the feature point extracting unit 23 applies, so as to be supplied thereto.

The identifier generating unit 25 generates identifiers using feature amounts calculated in this way. The processing of the identifier generating unit 25 has been described with reference to the flowchart in FIG. 8, so description thereof will be omitted.

Modifications

The above-described filers may be individually applied to a predetermined image, or multiple filters may be combined and applied to a predetermined image.

About Recognition Processing

Next, additional description will be made regarding processing for detecting (recognizing) subjects such as people, for example, using the results of learning. Upon an input image being input to the recognition device 13, and detection of a person which is a target object being instructed, the recognition device 13 starts person detection processing, so as to detect target objects from the input image. The following is a description of person detection processing with the recognition device 13.

Note that the image input unit 31, multiple-resolution image generating unit 32, feature point extracting unit 33, and feature amount calculating unit 34 of the recognition device 13 may be configured in the same way as the image input unit 21, multiple-resolution image generating unit 22, feature point extracting unit 23, and feature amount calculating unit 24 of the learning device 11. Accordingly, description made above regarding the image input unit 21, multiple-resolution image generating unit 22, feature point extracting unit 23, and feature amount calculating unit 24 of the learning device 11, and description regarding filters and the like, are applicable to the recognition device 13, so such redundant detailed description will be omitted here.

In step S151, an image to be recognized is input by the image input unit 31 of the recognition device 13 (FIG. 1), which is supplied to the multiple-resolution image generating unit 32, whereupon the multiple-resolution image generating unit 32 generates a multiple resolution image. This processing is performed in the same way as with the above-described step S11 (FIG. 6) for example, and detailed description thereof has already been made, so detailed description thereof will be omitted here.

Note that when the multiple-resolution image generating unit 32 generates a multiple resolution image, an image of the same scale (resolution as the multiple resolution image generated by the multiple-resolution image generating unit 22 of the learning device 11 is generated. Matching the scale coefficient (information relating to resolution) at the time of learning and the scale coefficient at the time of recognition allows efficient scanning to be performed at the time of recognition.

In step S152, the feature point extracting unit 33 performs processing the same as with the processing of step S12 in FIG. 6, so as to extract feature points from the input image that has been input and supplies the extracted feature points to the feature amount calculating unit 34 along with the input image. Accordingly, the positions and number of extracted feature points differ depending on what sort of filter is being used. Also, the multiple resolution image which is applied is an image that is suitable for the filter.

In step S153, the feature amount calculating unit 34 performs feature amount calculation based on the input image and feature points form the feature point extracting unit 33, and calculates the feature amount of each feature point. The feature amount calculating unit 34 then supplies the obtained feature amounts to the identification calculating unit 35. Note that this feature amount calculation processing is the same processing as the feature amount calculation processing described with reference to FIG. 7, so description thereof will be omitted here. Also, with embodiments of the present invention, various filters may be used for the feature amount calculation processing, such as filters described above, for example, the filter A shown in FIG. 14.

In step S154, the identification calculating unit 35 reads out a features amount for identification and an identifier from the identifier storage unit 12, and substitutes the features amount in the identifier read out and performs calculation thereof. That is to say, the identification calculating unit 35 substitutes, of the feature amounts from the feature amount calculating unit 34, those corresponding to the features amount for identification into identifiers indicated by Expression (7) or Expression (8), and performs computation.

Now, a feature amount to be substituted into a weak identifier making up the identifier is a feature amount obtained from a feature point pair or a feature point on the input image, at the same position as a feature point pair or a feature point at the same position of the learning image. Also, the feature amount used as the feature amount for identification is the feature amount used for setting the weak identifier making up the identifier at the time of the statistical learning processing.

For example, upon the computation of Expression (7) being performed, a "+1" indicating that a person who is a target objects exists within the input image, or a "−1" indicating that a person who is a target objects does not exist within the input image, is obtained as the result of the computation. The identification calculating unit 35 supplies the computation results from the identifier to the identification result output unit 36.

In step S155, the identification result output unit 36 outputs the detection results of objects (people) based on the computation results from the identification calculating unit 35, and the object detecting processing ends. That is to say, identification results of whether or not a target object has been recognized in the input image are output.

For example, an arrangement may be made wherein an input image in which a frame is displayed in a region where a person who is a target object is displayed, is displayed on the identification result output unit 36, as the identification results of whether or not a target object has been recognized in the input image.

Thus, the recognition device 13 extracts feature points from the input image and obtains feature amounts of pairs of feature points, and also extracts feature points from the input image and obtains feature amounts. The recognition device 13 then uses the obtained feature amounts and feature amounts, and identifiers recorded in the identifier storage unit 12, to detect target objects from the input image. Accordingly, target objects can be detected from images in a more sure manner by detecting target objects from input images using feature amounts.

About the Recording Medium

The series of processing described above may be executed by hardware, or may be executed by software. In the case of executing the series of processing by software, a program making up the software is installed in a computer. The term "computer" as used here encompasses computers built into dedicated hardware, general-purpose computers capable of executing various types of functions by various types of programs being installed therein, an example of which is a personal computer, and so forth.

Figure 21:
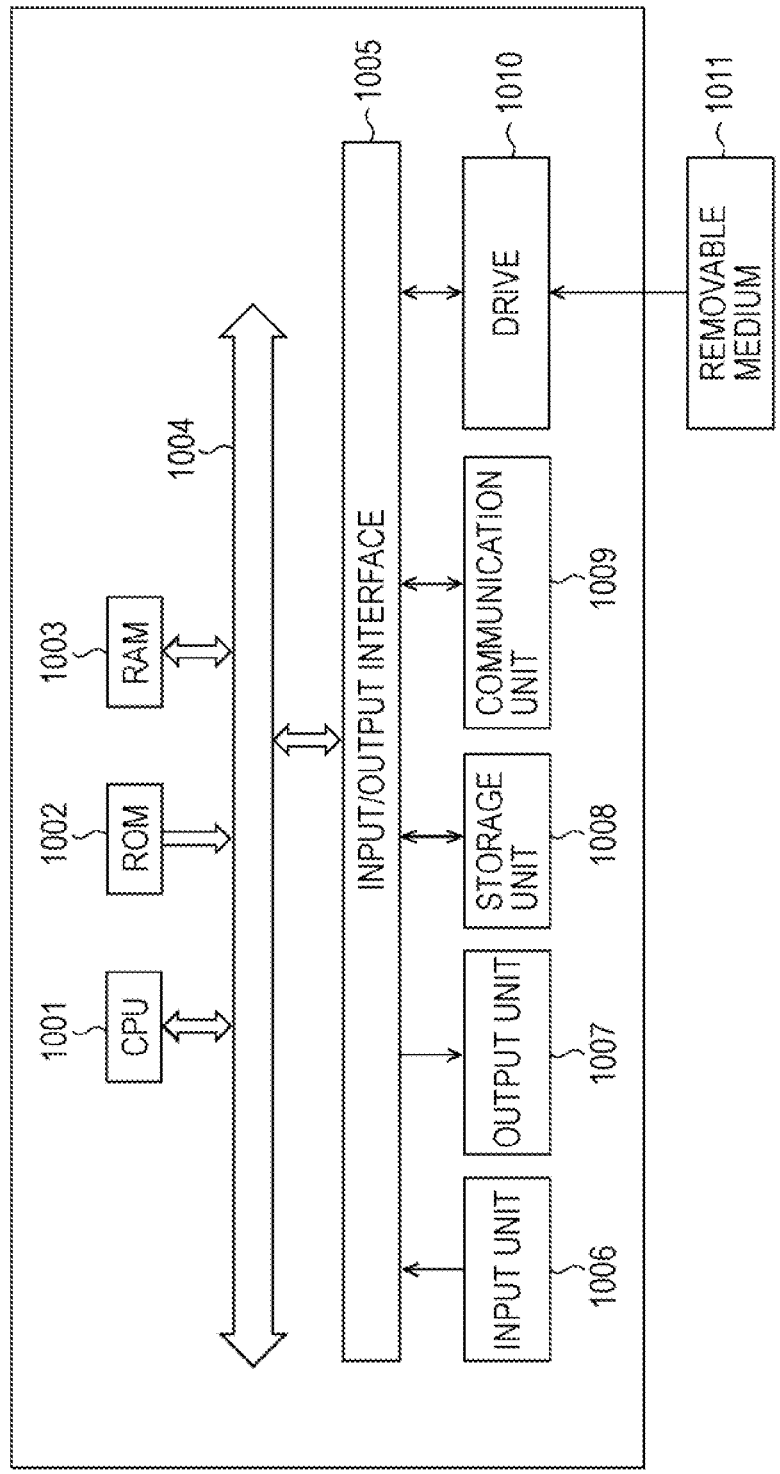
FIG. 21 is a diagram for describing a recording medium.

FIG. 21 is a block diagram illustrating a configuration example of the hardware of a computer which executes the above-described series of processing according to a program. With the computer, a CPU (Central Processing Unit) 1001, and ROM (Read Only Memory) 1002, RAM (Random Access Memory) 1003 are mutually connected via a bus 1004. An input/output interface 1005 is further connected to the bus 1004. An input unit 1006, output unit 1007, storage unit 1008, communication unit 1009, and drive 1010, are connected to an input/output interface 1004.

The input unit 1006 is made up of a keyboard, mouse, microphone, and so forth. The output unit 1007 is made up of a display, speaker, an so forth. The storage unit 1008 was made up of memory such as a hard disk, non-volatile memory, and so forth. The drive 1010 drives removable media 1011 such as a magnetic disk, optical disc, magneto-optical disc, semiconductor memory, or the like.

With a computer configured as described above, the CPU 1001 loads a program stored in the storage unit 1008 for example, to the RAM 1003 via the input/output interface 1005 and bus 1004, and executes the program, thereby carrying out the above-described series of processing.

A program which the computer (CPU 1001) executes can be recorded in removable media 1011 as packaged media or the lie, for example, so as to be provided. Also, the program can be provided by way of cable or wireless transmission media such as a local area network, the Internet, digital satellite broadcasting, or the like.

With the computer, the program can be installed to the storage unit 1008 via the input/output interface 1005 by mounting the removable media 1011 to the drive 1010. Also, the program can be installed to the storage unit 1008 by being received at the communication unit 1009 via the cable or wireless transmission media. Alternatively, the program may be installed in the ROM 1002 or storage unit 1008 beforehand.

It should be noted that the program which the computer executes may be a program wherein processing is performed following the order described in the present Specification in time sequence, or may be a program wherein processing is performed at appropriate timing, such as when called up or the like. It should be further noted that with the present Specification, the term "system" refers to the entirety of equipment configured of multiple devices.

It should be understood that embodiments of the present invention are not restricted to the above-described, and that various modifications may be made without departing of the essence of the present invention.

The present application contains subject matter related to that disclosed in Japanese Priority Patent Application JP 2009-275815 filed in the Japan Patent Office on Dec. 3, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning device comprising:
   generating means configured to generate an image having different resolution from an input image;
   extracting means configured to extract a feature point serving as a processing object from the image generated by the generating means;
   calculating means configured to calculate a feature amount of the feature point by subjecting the feature point to filter processing employing a predetermined filter; and
   identifier generating means configured to generate an identifier for detecting a predetermined target object from the generated image by statistical learning employing the feature amount;
   wherein the predetermined filter includes a plurality of regions, and the calculating means takes a difference value of difference between a first region of the plurality of regions and a second region of the plurality of regions as the feature amount, wherein a size of the first region is different than a size of the second region, and
   wherein the calculating means execute convolution operation in a differential function of a predetermined order of a Gaussian function in an arbitrary angle to calculate summation of absolute values of operation results.

2. The learning device according to claim 1, wherein the plurality of regions of the predetermined filter have a rectangular shape.

3. A learning method comprising the steps of:
   generating an image having different resolution from an input image;
   extracting a feature point from the generated image;
   calculating a feature amount of the feature point by subjecting the feature point to filter processing employing a predetermined filter; and
   generating an identifier for detecting a predetermined target object from the generated image by statistical learning employing the feature amount;
   wherein the predetermined filter includes a plurality of regions, and a difference value of the difference between a first region of the plurality of regions and a second region of the plurality of regions thereof is taken as the feature amount, wherein a size of the first region is different than a size of the second region, and
   wherein convolution operation in a differential function of a predetermined order of a Gaussian function in an arbitrary angle is executed to calculate summation of absolute values of operation results.

4. A non-transitory computer-readable storage medium having stored thereon, a set of computer-executable instructions, the computer-executable instructions when executed by a computer causes the computer to perform steps comprising:
   generating an image having different resolution from an input image;
   extracting a feature point from the generated image;
   calculating a feature amount of the feature point by subjecting the feature point to filter processing employing a predetermined filter; and generating an identifier for detecting a predetermined target object from the generated image by statistical learning employing the feature amount;

wherein the predetermined filter includes a plurality of regions, and a difference value of the difference between a first region of the plurality of regions and a second region of the plurality of regions is taken as the feature amount, wherein a size of the first region is different than a size of the second region, and wherein convolution operation in a differential function of a predetermined order of a Gaussian function in an arbitrary angle is executed to calculate summation of absolute values of operation results.

5. A learning device comprising:

a generating unit configured to generate an image having different resolution from an input image;

an extracting unit configured to extract a feature point serving as a processing object from the image generated by the generating unit;

a calculating unit configured to calculate a feature amount of the feature point by subjecting the feature point to filter processing employing a predetermined filter; and an identifier generating unit configured to generate an identifier for detecting a predetermined target object from the generated image by statistical learning employing the feature amount;

wherein the predetermined filter includes a plurality of regions, and the calculating unit takes a difference value of difference between a first region of the plurality of regions and a second region of the plurality of regions as the feature amount, wherein a size of the first region is different than a size of the second region, and wherein the calculating unit executes convolution operation in a differential function of a predetermined order of a Gaussian function in an arbitrary angle to calculate summation of absolute values of operation results.

\* \* \* \* \*